United States Patent
Ueda et al.

(10) Patent No.: US 7,387,844 B2
(45) Date of Patent: Jun. 17, 2008

(54) ALUMINUM ALLOY COMPOSITE FOR BRAZING AND HEAT EXCHANGER INCLUDING THE SAME

(75) Inventors: Toshiki Ueda, Tochigi (JP); Fumihiro Koshigoe, Tochigi (JP); Fumihiro Sato, Tochigi (JP)

(73) Assignee: Kabushiki Kaisha Kobe Seiko Sho, Kobe-shi (JP)

( * ) Notice: Subject to any disclaimer, the term of this patent is extended or adjusted under 35 U.S.C. 154(b) by 0 days.

(21) Appl. No.: 10/543,496

(22) PCT Filed: Sep. 18, 2003

(86) PCT No.: PCT/JP03/11872

§ 371 (c)(1),
(2), (4) Date: Jul. 27, 2005

(87) PCT Pub. No.: WO2005/028153

PCT Pub. Date: Mar. 31, 2005

(65) Prior Publication Data

US 2006/0141282 A1 Jun. 29, 2006

(51) Int. Cl.
*B32B 15/01* (2006.01)
*B32B 15/04* (2006.01)
*B32B 15/20* (2006.01)

(52) U.S. Cl. .................. 428/654; 428/213; 428/220; 428/548

(58) Field of Classification Search ............... 428/650, 428/654, 213, 220, 546, 548; 165/148; 29/726
See application file for complete search history.

(56) References Cited

U.S. PATENT DOCUMENTS 5,260,142 A * 11/1993 Kawabe et al. ............... 428/654

(Continued)

FOREIGN PATENT DOCUMENTS

JP 2-37992 2/1990

(Continued)

OTHER PUBLICATIONS

"ASM Specialty Handbook", Aluminum and Aluminum Alloys, Third Edition, 1996, Edited by J.R. Davis, pp. 20-22 and 41, 43 and 44. (no month).

*Primary Examiner*—Michael La Villa
(74) *Attorney, Agent, or Firm*—Oblon, Spivak, McClelland, Maier & Neustadt, P.C.

(57) ABSTRACT

An Al—Si based brazing material is formed on one surface of a core material, and a cladding material is formed on the other surface of the core material with a cladding ratio of 6 to 30% with respect to an entire thickness thereof. The core material contains 0.2 mass % or less of Mg, 0.3 mass % or less of Cr, 0.2 mass % or less of Fe, 0.2 to 1.0 mass % of Cu, 0.05 to 1.3 mass % of Si, 0.3 to 1.8 mass % of Mn, and 0.02 to 0.3 mass % of Ti in such a manner that a total content of Cu and Si is in the range of 2.0 mass % or less. The cladding material contains 2 to 9 mass % of Zn, 0.3 to 1.8 mass % of Mn and/or 0.04 to 1.2 mass % of Si, and further contains 0.02 to 0.25 mass % of Fe, 0.01 to 0.30 mass % of Cr, 0.005 to 0.15 mass % of Mg, and/or 0.001 to 0.15 mass % of Cu.

4 Claims, 1 Drawing Sheet

U.S. PATENT DOCUMENTS 5,350,436 A * 9/1994 Takezoe et al. ............... 75/314
2002/0034653 A1 * 3/2002 Okamoto et al. ............ 428/654

FOREIGN PATENT DOCUMENTS

| JP | 05-318171 | 12/1993 |
| JP | 08-283891 | 10/1996 |
| JP | 9-287062 | 11/1997 |
| JP | 9-291326 | 11/1997 |
| JP | 11-061305 | 3/1999 |
| JP | 11-061306 | 3/1999 |
| JP | 11-172357 | 6/1999 |
| JP | 2000-026931 | * 1/2000 |
| JP | 2000-26931 | 1/2000 |
| JP | 2001-026850 | 1/2001 |
| JP | 2002-294377 | * 10/2002 |
| JP | 2003-268470 | 9/2003 |
| JP | 2003-293060 | 10/2003 |
| JP | 2003-293064 | 10/2003 |

* cited by examiner

US 7,387,844 B2

ALUMINUM ALLOY COMPOSITE FOR BRAZING AND HEAT EXCHANGER INCLUDING THE SAME

TECHNICAL FIELD

The present invention relates to an aluminum alloy composite material suitable for brazing sheet that is used in a tube, a header plate, and a heater core of a radiator in an automobile and the like, and also relates to a heat exchanger. More particularly, the present invention relates to an aluminum alloy composite material for brazing that has high strength, has high corrosion resistance on an inner-surface side (coolant side) when being used as a radiator, a heater core, and a radiator tube, and can be made thin, and also relates to a heat exchanger using that aluminum alloy composite material.

BACKGROUND ART

In an aluminum alloy composite material for brazing in which a core material is cladded with a brazing material on one surface and a cladding material on the other surface, the strength of the core material is improved by adding Mg to the core material. However, when the Mg content in the core material exceeds 0.2% by mass (0.2 mass %), the brazeability is extremely lowered. Therefore, addition of Mg to the core material is not preferable.

An aluminum alloy composite material is proposed which can be made thin without hindering the corrosion resistance, the brazeability, and the like (see Japanese Patent Laid-Open Publication Nos. Hei 8-283891 and Hei 11-61306). Especially, in the aluminum alloy composite material described in Japanese Patent Laid-Open Publication No. Hei 8-283891, the cladding material contains Mg of 0.3 to 3 mass % and Zn of 2.2 to 5 mass %. This aluminum alloy composite material improves the strength of the cladding material by the addition of Mg.

Moreover, an aluminum alloy composite material is proposed in which the strength of the cladding material is improved by adding Mn and Si to the cladding material, instead of Mg (see Japanese Patent Laid-Open Publication No. Hei 11-61306).

However, the conventional techniques described above have the following disadvantages. First, the aluminum alloy composite material described in Japanese Patent Laid-Open Publication No. Hei 8-283891 aims to improve the strength by adding Mg to the cladding material. However, when the aluminum alloy composite material is made thinner, Mg is diffused by heat during brazing and reaches a surface of the brazing material through the core material, thus deteriorating the brazeability. Therefore, it is necessary to form the core material to be thick in order to ensure a desired brazeability. That is, making the aluminum composite material thin is limited. Moreover, in this conventional aluminum alloy composite material, the brazeability on the cladding material side is inferior to that of the brazing material. Therefore, this conventional aluminum alloy composite material cannot be used as a tube material that is brazed on the cladding material side.

On the other hand, the aluminum alloy described in Japanese Patent Laid-Open Publication No. Hei 11-61306 aims to improve the strength by adding Mn and Si to the cladding material. However, making the aluminum alloy composite material thinner without deteriorating the corrosion resistance and the like only by adding Mn and Si to the cladding material has a limitation. More specifically, in case of adding Si to the cladding material, precipitation of Al—Mn—Si precipitates at grain boundaries occurs during brazing. Thus, the corrosion resistance of the cladding material is deteriorated and a time period during which the cladding material serves as a sacrifice anode layer is shortened. This results in deterioration of the corrosion resistance of the cladding material on the inner-surface side (coolant side). Moreover, the core material usually contains Cu that is diffused into the cladding material during the brazing. Thus, precipitation of Al—Cu—Si precipitates or Al—Mn—Cu—Si precipitates occurs at the grain boundaries in the cladding material so as to deteriorate the corrosion resistance of the cladding material. This also causes deterioration of the corrosion resistance of the cladding material on the inner-surface side.

DISCLOSURE OF THE INVENTION

It is an object of the present invention to provide an aluminum alloy composite material for brazing that has high strength, has good corrosion resistance on its inner-surface side (coolant side) when being used as a tube, a header plate, and a heater core of a radiator, and can be made thin, and to provide a heat exchanger using that aluminum alloy composite material.

According to a first aspect of the present invention, an aluminum alloy composite material for brazing comprises: a core material; a brazing material formed of an Al—Si based aluminum alloy on one surface of the core material; and a cladding material formed on the other surface of the core material with a cladding ratio of 6 to 30% with respect to an entire thickness of the aluminum alloy composite material. The core material contains 0.2 mass % or less of Mg, 0.3 mass % or less of Cr, 0.2 mass % or less of Fe, 0.2 to 1.0 mass % of Cu, 0.05 to 1.3 mass % of Si, 0.3 to 1.8 mass % of Mn, and 0.02 to 0.3 mass % of Ti in such a manner that a total content of Cu and Si is in the range of 2.0 mass % or less and a remainder of a composition of the core material is Al and unavoidable impurities. The cladding material contains 2 to 9 mass % of Zn, at least one selected from the group consisting of 0.3 to 1.8 mass % of Mn and 0.04 to 1.2 mass % of Si, and at least one selected from the group consisting of 0.02 to 0.25 mass % of Fe, 0.01 to 0.30 mass % of Cr, 0.005 to 0.15 mass % of Mg, and 0.001 to 0.15 mass % of Cu.

In this aluminum alloy composite material for brazing, it is preferable that the cladding material contain 3 mass % or more of Zn and a Zn/Si ratio be 4 or more.

According to a second aspect of the present invention, an aluminum alloy composite material for brazing comprises: a core material; a brazing material formed of an Al—Si based aluminum alloy on one surface of the core material; and a cladding material formed on the other surface of the core material with a cladding ratio of 6 to 30% with respect to an entire thickness of the aluminum alloy composite material. The core material contains 0.2 mass % or less of Mg, 0.3 mass % or less of Cr, 0.2 mass % or less of Fe, 0.2 to 1.0 mass % of Cu, 0.05 to 1.3 mass % of Si, 0.3 to 1.8 mass % of Mn, and 0.02 to 0.3 mass % of Ti in such a manner that a total content of Cu and Si is in the range of 2.0 mass % or less and a remainder of a composition of the core material is Al and unavoidable impurities. The cladding material contains 2 to 9 mass % of Zn, 0.3 to 1.8 mass % of Mn, 0.5 to 1.2 mass % of Si, and at least one selected from the group consisting of 0.02 to 0.25 mass % of Fe, 0.01 to 0.30 mass % of Cr, 0.005 to 0.15 mass % of Mg, and 0.001 to 0.15 mass % of Cu. An average Si composition in the cladding material is equal to or less than 0.5 times Si content.

In this aluminum alloy composite material for brazing, it is preferable that the cladding material contains 3 mass % or more of Zn and a Zn/Si ratio be 4 or more.

A heat exchanger according to the present invention is assembled by performing brazing that uses the aluminum alloy composite material for brazing according to the second aspect of the present invention as a brazing sheet, wherein the brazing is performed at a cooling rate of 100° C./minute or more.

According to a third aspect of the present invention, an aluminum alloy composite material for brazing comprises: a core material; a brazing material formed of an Al—Si based aluminum alloy on one surface of the core material; and a cladding material formed on the other surface of the core material with a cladding ratio of 6 to 30% with respect to an entire thickness of the aluminum alloy composite material. The core material contains 0.2 mass % or less of Mg, 0.3 mass % or less of Cr, 0.2 mass % or less of Fe, 0.2 to 1.0 mass % of Cu. 0.05 to 1.3 mass % of Si, 0.3 to 1.8 mass % of Mn, 0.02 to 0.3 mass % of Ti, and a remainder of Al and unavoidable impurities. The cladding material contains 2 to 9 mass % of Zn, and at least one selected from the group consisting of 0.3 to 1.8 mass % of Mn and 0.04 to 1.2 mass % of Si. The cladding material further contains precipitates or crystallized particles having an average grain size smaller than 0.1 μm with a density of $5.0 \times 10^8$ particles/mm$^3$ or more.

According to the first through third aspects of the present invention, an aluminum alloy composite material for brazing can be achieved that has high strength and high corrosion resistance and that can be formed to be thin.

BEST MODE FOR CARRYING OUT THE INVENTION

Figure 1:
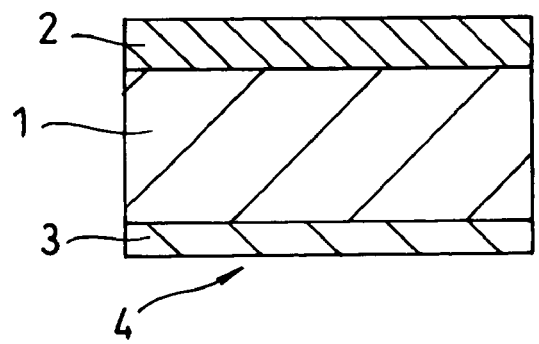
FIG. 1 is a cross-sectional view of an aluminum alloy composite material for brazing according to an embodiment of the present invention.

The inventors of the present invention made various experiments and researches in order to overcome the aforementioned problems. As a result, the inventors found that an aluminum alloy composite material could be made thinner largely while ensuring the brazeability, the corrosion resistance, and the strength, by making a cladding material contain Mn and Si in predetermined content ranges, setting the ratio of the thickness of the cladding material to that of the aluminum alloy composite material to achieve a predetermined range, making the cladding material contain at least one of Fe, Cr, Mg, and Cu, and limiting distribution of precipitates or crystallized particles in the cladding material.

Moreover, the corrosion resistance can be improved by setting "an average Si composition of the cladding material" to be equal to or less than "Si content"×0.5. Furthermore, the corrosion resistance on the inner-surface side (coolant side) of the aluminum alloy composite material can be improved by setting a cooling rate during brazing to be 100° C./minute or low.

A core material, a cladding material, and a brazing material of an aluminum alloy composite material for brazing according to the first aspect of the present invention are now described with respect to a reason why a component is added and a reason for limiting the composition. First, the composition of the core material is described.

[Core Material]

Mg (Magnesium): 0.2 Mass % or Less

Mg is an element that improves the strength of the core material. However, Mg lowers the brazeability when Mg content exceeds 0.2 mass %. Especially, in case of a Nocolok brazing method, the brazeability is largely lowered. Therefore, Mg content is limited to 0.2 mass % or less. In order to further suppress the deterioration of the brazeability, it is preferable that Mg content be 0.1 mass % or less.

Cu (Copper): 0.2 to 1.0 Mass %

Cu is an element that improves the strength of the core material and also improves the corrosion resistance of the core material on the brazing-material side. However, Cu added to the core material increases susceptibility to intergranular corrosion and therefore lowers the corrosion resistance of the core material on its cladding material side. Thus, 2 mass % or more of Zn is added to the cladding material. This addition of Zn can set a potential of the cladding material to be base with respect to a potential of the grain boundaries and can prevent intergranular corrosion. That is, it is possible to set the potential of the cladding material to be low with respect to the potential of the core material, especially potentials of a matrix and the grain boundaries of the core material by increasing Zn content in the cladding material. Therefore, intergranular corrosion can be prevented. When Cu content is less than 0.2 mass %, the strength of the core material cannot be improved sufficiently. On the other hand, when Cu content exceeds 1.0 mass %, a melting point of the core material is lowered and melting of the core material occurs during brazing. Therefore, Cu content is set in the range of 0.2 to 1.0 mass %.

Si (Silicon): 0.05 to 1.3 Mass %

Si is an element that improves the strength of the core material. Especially, Mn—Si precipitates improves the strength of the core material. However, when Si content is less than 0.05 mass %, the strength of the core material cannot be improved sufficiently. On the other hand, when Si content exceeds 1.3 mass %, the melting point of the core material is lowered, and melting of the core material occurs during brazing because of increase of a low-melting phase. Therefore, Si content is set in the range of 0.05 to 1.3 mass %.

Total Content of Cu and Si: 2.0 Mass % or Less

As described above, Cu and Si lower the melting point of the core material and cause melting of the core material during brazing, when the added amount exceeds a predetermined amount. In order to prevent the melting of the core material, it is necessary to limit the total content of Si and Cu to be 2.0 mass % or less. Therefore, the total content of Si and Cu is set to 2.0 mass % or less.

Mn (Manganese): 0.3 to 1.8 Mass %

Mn is an element that improves the corrosion resistance, the brazeability, and the strength of the core material. When Mn content is less than 0.3 mass %, the strength cannot be improved. However, when Mn content exceeds 1.8 mass %, large compounds are generated, thus lowering the workability. Therefore, Mn content is set in the range of 0.3 to 1.8 mass %.

Ti (Titanium): 0.02 to 0.3 Mass %

Ti is an element that improves the corrosion resistance of the core material extremely. When Ti content is less than 0.02 mass %, Ti cannot improve the corrosion resistance of the core material sufficiently. On the other hand, even when Ti content exceeds 0.3 mass %, Ti cannot further improve the corrosion resistance of the core material but generates large compounds. Thus, the workability of the aluminum composite material is lowered. Therefore, Ti content is set in the range of 0.02 to 0.3 mass %. As described above, Ti is an element that is indispensable for improvement of the corrosion resistance of the core material. When Ti is added to the core material, precipitation in layers occurs in the core material so as to suppress progress of pitting corrosion in a depth direction. Moreover, addition of Ti changes the potential of the core material to be noble. In addition, Ti is small in a diffusion rate in an aluminum alloy and does not move largely during brazing. Therefore, addition of Ti is effective to maintain a potential difference between the core material and the brazing material or between the core material and the cladding material so as to electrochemically prevent corrosion of the core material.

Cr (Chromium): 0.3 Mass % or Less

Cr is an element that improves the corrosion resistance, the strength, and the brazeability of the core material. When Cr content exceeds 0.3 mass %, the corrosion resistance, the strength, and the brazeability of the core material cannot be further improved. Instead, the workability is deteriorated because of large compounds. Therefore, Cr content is set in the range of 0.3 mass % or less. It is preferable that Cr content be in the range of 0.02 to 0.3 mass %.

Fe (Iron): 0.2 Mass % or Less

Fe is an element that makes crystal grains in the core material finer and improves the strength and the weldability of the core material. When Fe content exceeds 0.2 mass %, the corrosion resistance of the core material is deteriorated. Therefore, Fe content is set in the range of 0.2 mass % or less. It is more preferable that Fe content be in the range of 0.02 to 0.2 mass %.

[Cladding Material]

The composition of the cladding material is now described.

Mn (Manganese): 0.3 to 1.8 Mass %

Mn is an element that improves the strength of the cladding material. In other words, Mn in the form of solid solution in the cladding material improves the strength of the material. When Mn content is less than 0.3 mass %, the sufficient amount of Mn solid solution cannot be obtained. Therefore, the strength cannot be ensured. On the other hand, when Mn content is more than 1.8 mass %, compounds increase. Those compounds deteriorate the workability of the cladding material and serve as starting points of crack, thus deteriorating the workability of the entire composite material. Therefore, in case of adding Mn to the cladding material, Mn content in the cladding material is set in the range of 0.3 to 1.8 mass %.

Si (Silicon): 0.04 to 1.2 Mass %

Si improves the strength of the cladding material like Mn, when being added to the cladding material. When Si content is less than 0.04 mass %, the improvement of the strength is not sufficient. When Si content is more than 1.2 mass %, the susceptibility to intergranular corrosion is increased and the corrosion resistance is lowered. Therefore, in case of adding Si to the cladding material, Si content is set in the range of 0.04 to 1.2 mass %. Please note that Mn and Si have the same effect and therefore it is only necessary to add at least one of Mn and Si.

Zn (Zinc): 2 to 9 Mass %

Zn is added to the cladding material in order to make a potential of the cladding material to be base. In this case, when Cu content in the core material is 0.2 mass % or less, a sufficient sacrifice anode effect can be achieved and the corrosion resistance can be maintained, even if Zn content in the cladding material is less than 2 mass %. However, when Cu content in the core material exceeds 0.2 mass % but does not exceed 1.0 mass %, it is necessary to set Zn content in the cladding material to the range of 2 to 9 mass %. This is because a sufficient potential difference cannot be ensured between the cladding material and grain boundaries when Zn content in the cladding material is less than 2 mass %. In this case, intergranular corrosion occurs and the corrosion resistance of the core material in the cladding material-side is deteriorated. On the other hand, when Zn content in the cladding material exceeds 9 mass %, a rate of self-corrosion of the cladding material itself increases. Thus, the cladding material is exhausted early, a time period during which the cladding material has a sacrifice anode effect is shortened, and the corrosion resistance is deteriorated. Please note that it is preferable that Zn content be 3 mass % or more in order to keep a good balance between the strength and the corrosion resistance while the amount of Si is increased.

The strength of the cladding material can be further improved by adding at least one of Mn and Si as described above and further adding at least one of Fe, Cr, Mg, and Cu. This is effective for the improvement of the strength of the entire thickness.

Fe: 0.02 to 0.25 Mass %

Fe makes the crystal grains in the cladding material finer and is solved in the form of solid solution, thereby improving the strength of the cladding material. When Fe content is less than 0.02 mass %, the effect of making the crystal grains finer and the effect of improving the strength are not sufficient. When Fe content exceeds 0.25 mass %, the amount of intermetallic compounds and crystallized particles that contain Fe in the cladding material is increased so as to increase cathode sites. Thus, a corrosion rate of the cladding material is increased and the corrosion resistance is deteriorated. Therefore, in case of adding Fe, Fe content is set in the range of 0.25 mass % or less. It is more preferable that Fe content be in the range of 0.02 to 0.2 mass %.

Cr: 0.01 to 0.30 Mass %

Cr is an element that improves the corrosion resistance and the strength in the cladding material. When Cr content exceeds 0.3 mass %, the corrosion resistance and the strength of the cladding material cannot be further improved. Moreover, since the amount of crystallized particles that contain Cr is increased so as to increase cathode sites, the corrosion rate of the cladding material itself is increased and the corrosion resistance is deteriorated. For this reason, Cr content is set in the range of 0.3 mass % or less. On the other hand, in the case where Cr content is 0.01 mass % or less, the effects of improving the strength and the corrosion resistance cannot be obtained. Therefore, when Cr is added, Cr content is set in the range of 0.01 to 0.30 mass %.

Mg: 0.005 to 0.15 Mass %

Mg in the form of solid solution in the cladding material improves the strength of the cladding material. Moreover, in the case where Mg and Si exist together in the cladding material, Mg can further improve the strength because of an effect achieved by dispersion of $Mg_2Si$ precipitates. When Mg content exceeds 0.15 mass %, Mg degrades the brazeability at a site at which the cladding material is bonded. For this reason, Mg content is set to 0.15 mass % or less. In addition, when Mg content is less than 0.005 mass %, the effect of improving the strength is small. Therefore, in case of adding Mg, Mg content is set in the range of 0.005 to 0.15 mass %.

Cu: 0.001 to 0.15 Mass %

Cu in the form of solid solution in the cladding material improves the strength of the cladding material. In the case where Cu content in the cladding material exceeds 0.15 mass %, the potential of the cladding material is noble. Thus, even if Cu content in the core material is set in the range of 0.2 to 1 mass % and the content of Zn in the cladding material is set in the range of 2 to 7%, the sacrifice anode effect of the cladding material with respect to the core material is lowered and therefore the corrosion resistance of the core material on the cladding material-side is deteriorated. In the case where Cu content is less than 0.001 mass %, the effect of improving the strength is small and the sufficient increase of the strength of the cladding material cannot be achieved.

Cladding Ratio of the Cladding Material: 6 to 30% of an Entire Thickness of the Aluminum Alloy Composite Material When a cladding ratio of the cladding material having the above-noted composition of the present invention is set to 6% or more, it is possible to obtain the sufficient strength while maintaining the corrosion resistance, even if the aluminum alloy composite material is made very thin. In the case where the cladding ratio is smaller than 6%, the sacrifice anode effect of the cladding material is not sufficient. Thus, the corrosion resistance of the core material is deteriorated. For this reason, the cladding ratio of the cladding material having the composition of the present invention is set to 6% or more with respect to the entire thickness.

Moreover, in the case where the cladding ratio of the cladding material is set to 30% or more, the thickness of the core material is relatively reduced and the corrosion resistance of the core material on the outer-surface side is deteriorated. Therefore, an upper limit of the cladding ratio is set to 30%. Thus, the cladding ratio of the cladding material is set to 6 to 30%.

It is Preferable That Zn Content be 3 Mass % or More and a Zn/Si Ratio be 4 or More Although addition of Si to the cladding material improves the strength of the cladding material, it deteriorates the corrosion resistance (intergranular corrosion resistance). In order to keep a good balance between the strength and the corrosion resistance in a state where the amount of Si is increased, it is preferable that Zn content be set to 3 mass % or more. Moreover, when a Zn/Si ratio is set to 4 or more, the corrosion resistance and the strength that are in preferable ranges, respectively, can be achieved at the same time, even if the aluminum alloy composite material is made very thin. Therefore, it is preferable that Zn content be 3 mass % or more and the Zn/Si ratio be 4 or more.

[Brazing Material]

Next, the brazing material is described. An Al—Si based alloy such as A4045 alloy, that is used as a conventional brazing material, can be used as the brazing material of the present invention. Moreover, when Zn is added to the brazing material, the brazing material can be made to serve as a sacrifice anode positively. In this case, it is preferable that Zn content in the brazing material be set to be the same as that in the cladding material, i.e., 2 to 5 mass %. In addition, it is necessary to ensure a large potential difference between a fin member and an outer surface of the brazing material in order to ensure the corrosion resistance of a surface of the brazing material. Therefore, a minute amount of a metal element for increasing a potential, such as Cu may be added to the brazing material.

The aforementioned compositions of the core material, the cladding material, and the brazing material may be adjusted before cladding independently of each other. Alternatively, those compositions may be adjusted by controlling conditions of heating and cooling during brazing and the like so as to diffuse an element contained in one of the core material, the cladding material, and the brazing material to another material.

Next, the second aspect of the present invention is described. According to the second aspect of the present invention, Mn and Si are essential in the cladding material, unlike the first aspect of the present invention recited in claim 1. Moreover, the Si composition in the cladding material is different from that in the first aspect of the present invention, and an "average Si composition" in the cladding material is equal to or less than (Si content)×½. Except for the above, the second aspect of the present invention is the same as the first aspect of the present invention.

The second aspect of the present invention is now described with respect to the differences from the first aspect of the present invention. The detailed description of the same components as those in the first aspect of the present invention is omitted here. In the second aspect of the present invention, the composition of the cladding material is different from that in the first aspect of the present invention in the following points.

Si (Silicon): 0.5 to 1.2 Mass %

Si improves the strength of the cladding material in the same manner as that of Mn, when being added to the cladding material. Moreover, the effect of improving the strength is enhanced by adding both Mn and Si. When Si content is less than 0.5 mass %, the effect of improving the strength is not sufficient. When Si content is larger than 1.2 mass %, the susceptibility to intergranular corrosion is enhanced and the corrosion resistance is deteriorated. Therefore, in case of adding Si to the cladding material, Si content is set in the range of 0.5 to 1.2 mass %. Please note that Mn and Si have the same effects and therefore it is only necessary to add at least one of Mn and Si.

"Average Si Composition" in the Cladding Material is Equal to or Less Than (Si content)×½

In the case where an aluminum alloy contains Si, Si mainly exists in any of the following three ways. (1) Si exists in the aluminum alloy by itself. When Si content is about 1 mass % or less, Si usually exists in the form of solid solution or as a single-element Si precipitate having a size of 1 μm or less. (2) When about 1 mass % of Si and about 1 mass % of Mn exist together, Al—Mn—Si crystallized particles (having a grain size of several microns to several tens of microns) are generated during casting. (3) When about 1 mass % of Si and about 1 mass % of Mn exist together, Al—Mn—Si precipitates having a grain size of several microns or less are obtained other than the above crystallized particles during casting, depending on a condition of a heat (soaking) treatment and a cooling condition. The "average Si composition" means a total content of Si in the crystallized particles having the grain size described in (2) other than a large crystallized particles having a grain size of 10 μm or more, and Si described in (1) and (3). The "average Si composition" can be measured as Si concentration obtained by performing line analysis for Si and Mn with a commercially available EPMA (Electron Probe Micro-analyzer), except for a peak at which both Mn and Si show large intensities in a range of 10 μm or more (that is considered as a peak from large crystallized particles having a grain size of 10 μm or more).

In the case where the amount of Si in the form of solid solution in a material is large, an effect of accelerating precipitation of Al—Mn—Si, Al—Mn—Si—Cu, and Al—Si—Cu precipitates at grain boundaries during cooling of brazing is large. This is because Si in the form of solid solution in crystal grains can be easily diffused. Moreover, fine ones of the precipitates described in above (1), (2) and (3) behave in a similar manner to Si in the form of solid solution, because they can be easily solved to form solid solution during heating of the brazing. Thus, those fine precipitates also have the effect of accelerating precipitation of Al—Mn—Si, Al—Mn—Si—Cu, and Al—Si—Cu precipitates at grain boundaries during cooling. Thus, according to the present invention, a ratio of Si in the form of solid solution and the fine precipitates is lowered, i.e., the average Si composition is made equal to or less than (Si content)×0.5, thereby suppressing the amount of Si reaching the grain boundary during cooling of brazing, and providing an effect that precipitation at grain boundaries hardly occurs. When the average Si composition exceeds (Si content)×0.5, the amount of the precipitates at grain boundaries is increased and the corrosion resistance of the cladding material is deteriorated. Consequently, the corrosion resistance of the brazing sheet is lowered on the cladding material side.

The average Si composition can be controlled by making Si stable as Al—Mn—Si crystallized particles in advance. More specifically, the average Si composition can be set to (Si content)×0.5 or less by setting the temperature of soaking of ingot of the cladding material to 520 to 630° C. Moreover, in the case where the soaking temperature is set to 400 to 520° C., the same effect can be achieved by setting a cooling rate during casting to 0.1 to 5° C./hour.

Cooling Rate During Brazing: 100° C./minute or More

Precipitation of Al—Mn—Si, Al—Mn—Si—Cu, and Al—Si—Cu precipitates at grain boundaries can be suppressed by controlling the amount of Si solid solution in the aforementioned manner and further setting the cooling rate to 100° C./minute or more. Setting the cooling rate during brazing to 100° C./minute or more can shorten a time required for diffusion of Si, Cu, and the like. Thus, the amount of the precipitates at the grain boundaries can be reduced. Moreover, the above setting of the cooling rate during brazing can improve the corrosion resistance, when being combined with the suppression of the amount of Si solid solution.

Next, the third aspect of the present invention is described. The third aspect of the present invention defines the number of particles of precipitates or crystallized particles.

Density of Precipitates or Crystallized Particles Having an Average Grain Size Less Than 0.1 µm is $5.0 \times 10^8$ Particles/mm$^3$ or More Intermetallic compounds mainly containing Al—Mn in the cladding material make at least a predetermined number of particles of the precipitates or crystallized particles having the size defined in the third aspect of the present invention distribute in the cladding material, thereby coarsening the grains in the cladding material after brazing and improving the corrosion resistance. After clad rolling of the cladding material and the core material and the like, those materials are cold-worked until an entire thickness reaches a predetermined thickness. In the case where there are precipitates or crystallized particles having the size defined in the present invention in the cladding material, a so-called pinning effect for suppressing movement of dislocation introduced into the cladding material during the cold work acts. That dislocation is set free from the pinning effect due to heating of brazing. However, in the case where there are only large precipitates or crystallized particles in the cladding material, the suppression of the movement of the dislocation by the pinning effect does not occur. Instead, recrystallization using the large precipitates or crystallized particles as nuclei preferentially occurs. Thus, after the brazing, the grain size in the cladding material becomes smaller and therefore intergranular corrosion can easily occur. However, when the precipitates or crystallized particles are controlled to be fine as in the present invention, the dislocation is pinned and is then set free during heating of the brazing. Thus, recrystallization is delayed and is then accelerated. Consequently, the grain size in the cladding material becomes large. Therefore, intergranular corrosion hardly occurs and the high corrosion resistance can be obtained.

When the size of the precipitates or crystallized particles is less then 0.01 µm, the pinning effect does not act sufficiently. Therefore, it is preferable that precipitates having a size in a range from approximately 0.01 µm to approximately 0.1 µm, the particle number of which is defined by the present invention or more, exist in the cladding material.

The size of the precipitates or crystallized particles in the cladding material can be adjusted in an appropriate manner in accordance with the composition of the cladding material, the temperature of a soaking process before rolling, and the heating temperature during the clad rolling.

Next, effects of Examples of the present invention are specifically described, comparing with Comparative Examples departing from the scope of the present invention.

Examples of the First Aspect of the Present Invention

Table 1 shows the composition of the core material and Table 2 shows the composition of the cladding material. In Table 1, Core materials Nos. A1 to A5 are Examples of the present invention and Core materials Nos. A6 to A18 are Comparative Examples. In Table 2, Cladding materials Nos. A1 to A4 and A11 to A13 are Examples of the present invention and Cladding materials Nos. A5 to A10 are Comparative Examples departing from the scope of the claims reciting the first aspect of the present invention.

TABLE 1

| Core material No. | Core material composition (mass %) | | | | | | | | Remarks |
|---|---|---|---|---|---|---|---|---|---|
| | Si | Fe | Cu | Mn | Mg | Cr | Ti | Al | |
| A1 | 0.4 | 0.05 | 0.70 | 1.3 | 0.0 | 0.1 | 0.12 | Remainder | Examples |
| A2 | 0.8 | 0.05 | 0.70 | 1.3 | 0.0 | 0.1 | 0.12 | Remainder | |
| A3 | 1.0 | 0.05 | 0.70 | 1.3 | 0.0 | 0.1 | 0.12 | Remainder | |
| A4 | 0.8 | 0.05 | 0.30 | 1.3 | 0.0 | 0.1 | 0.12 | Remainder | |
| A5 | 0.8 | 0.05 | 0.90 | 1.3 | 0.0 | 0.1 | 0.12 | Remainder | |
| A6 | 0.03 | 0.05 | 0.70 | 1.3 | 0.0 | 0.1 | 0.12 | Remainder | Si: less than its lower limit of 0.05 mass % | Comparative examples |
| A7 | 0.8 | 0.05 | 0.15 | 1.3 | 0.0 | 0.1 | 0.12 | Remainder | Cu: less than its lower limit of 0.2 mass % |
| A8 | 0.8 | 0.05 | 0.70 | 0.2 | 0.0 | 0.1 | 0.12 | Remainder | Mn: less than its lower limit of 0.3 mass % |

TABLE 1-continued

| Core material No. | Core material composition (mass %) | | | | | | | | Remarks |
|---|---|---|---|---|---|---|---|---|---|
| | Si | Fe | Cu | Mn | Mg | Cr | Ti | Al | |
| A9 | 0.8 | 0.05 | 0.70 | 1.3 | 0.3 | 0.1 | 0.12 | Remainder | Mg: larger than its upper limit of 0.2 mass % |
| A10 | 0.8 | 0.05 | 0.70 | 1.3 | 0.0 | 0.0 | 0.12 | Remainder | Cr: less than its preferable lower limit of 0.02 mass % |
| A11 | 0.8 | 0.05 | 0.70 | 1.3 | 0.0 | 0.1 | 0.00 | Remainder | Ti: less than its lower limit of 0.02 mass % |
| A12 | 1.4 | 0.05 | 0.70 | 1.3 | 0.0 | 0.1 | 0.12 | Remainder | Si: larger than its upper limit of 1.4 mass % |
| A13 | 0.8 | 0.3 | 0.70 | 1.3 | 0.0 | 0.1 | 0.12 | Remainder | Fe: larger than its upper limit of 0.2 mass % |
| A14 | 0.8 | 0.05 | 1.1 | 1.3 | 0.0 | 0.1 | 0.12 | Remainder | Cu: larger than its upper limit of 1.0 mass % |
| A15 | 0.8 | 0.05 | 0.70 | 1.9 | 0.0 | 0.1 | 0.12 | Remainder | Mn: larger than its upper limit of 1.8 mass % |
| A16 | 0.8 | 0.05 | 0.70 | 1.3 | 0.0 | 0.1 | 0.31 | Remainder | Ti: larger than its upper limit of 0.3 mass % |
| A17 | 0.8 | 0.05 | 0.70 | 1.3 | 0.0 | 0.4 | 0.12 | Remainder | Cr: larger than its upper limit of 0.3 mass % |
| A18 | 1.2 | 0.05 | 0.90 | 1.3 | 0.0 | 0.1 | 0.12 | Remainder | Cu + Si: larger than its upper limit of 2.0 mass % |

TABLE 2

| Skin material No. | Skin material composition (mass %) | | | | | | | | Zn/Si | Remarks | |
|---|---|---|---|---|---|---|---|---|---|---|---|
| | Si | Fe | Cu | Mn | Mg | Zn | Cr | Al | | | |
| A1 | 0.8 | 0.17 | 0.10 | 0.89 | 0.01 | 4.5 | 0.03 | Remainder | 5.6 | | Examples |
| A2 | 0.04 | 0.17 | 0.02 | 0.9 | 0.02 | 4.5 | 0.05 | Remainder | 113 | | |
| A3 | 0.80 | 0.20 | 0.02 | 0.9 | 0.01 | 4.1 | 0.03 | Remainder | 5.1 | | |
| A4 | 0.6 | 0.20 | 0.03 | 0.8 | 0.08 | 3.0 | 0.15 | Remainder | 5.0 | | |
| A5 | 0.03 | 0.17 | 0.08 | 0.4 | 0.01 | 4.1 | 0.03 | Remainder | 136.7 | Si: less than its lower limit of 0.04 mass % | Comparative examples |
| A6 | 1.0 | 0.19 | 0.08 | 0.4 | 0.02 | 4.5 | 0.05 | Remainder | 4.5 | Si: larger than its upper limit of 0.9 mass % | |
| A7 | 0.1 | 0.22 | 0.03 | 0.2 | 0.10 | 3.2 | 0.15 | Remainder | 3.2 | Mn: less than its lower limit of 0.3 mass % | |
| A7-2 | 0.8 | 0.18 | 0.10 | 2.3 | 0.02 | 4.2 | 0.15 | Remainder | 5.25 | Mn: larger than its upper limit of 1.8 mass % | |
| A8 | 0.85 | 0.20 | 0.08 | 1.1 | 0.12 | 3.2 | 0.03 | Remainder | 3.7 | Zn/Si ratio: less than 4 | |
| A9 | 0.4 | 0.21 | 0.03 | 0.4 | 0.11 | 1.8 | 0.05 | Remainder | 4.5 | Zn: less than its lower limit of 2 mass % | |
| A10 | 0.25 | 0.22 | 0.03 | 0.6 | 0.03 | 9.5 | 0.15 | Remainder | 38 | Zn: larger than its upper limit of 9 mass % | |
| A11 | 0.08 | 0.18 | 0.12 | 0.9 | 0.10 | 3.8 | 0.15 | Remainder | 47.5 | | Examples |
| A12 | 0.75 | 0.18 | 0.02 | 0.5 | 0.02 | 4.5 | 0.10 | Remainder | 6.0 | | |
| A13 | 0.35 | 0.19 | 0.03 | 0.5 | 0.05 | 3.3 | 0.10 | Remainder | 9.4 | | |
| A14 | 0.8 | 0.30 | 0.04 | 0.9 | 0.10 | 4.2 | 0.10 | Remainder | 5.25 | Fe: larger than its upper limit of 0.25 mass % | Comparative examples |
| A15 | 0.8 | 0.01 | 0.01 | 0.9 | 0.08 | 4.2 | 0.03 | Remainder | 5.25 | Fe: less than its lower limit of 0.02 mass % | |
| A16 | 0.75 | 0.18 | 0.11 | 0.85 | 0.09 | 5.2 | 0.50 | Remainder | 6.93 | Cr: larger than its upper limit of 0.30 mass % | |

TABLE 2-continued

| Skin material No. | Skin material composition (mass %) | | | | | | | Zn/Si | Remarks |
|---|---|---|---|---|---|---|---|---|---|
| | Si | Fe | Cu | Mn | Mg | Zn | Cr | Al | | |
| A17 | 0.75 | 0.18 | 0.12 | 0.85 | 0.01 | 5.2 | 0.005 | Remainder | 6.93 | Cr: less than its lower limit of 0.01 mass % |
| A18 | 0.6 | 0.16 | 0.03 | 0.85 | 0.2 | 4.0 | 0.03 | Remainder | 6.67 | Mg: larger than its upper limit of 0.15 mass % |
| A19 | 0.6 | 0.16 | 0.05 | 0.85 | 0.002 | 4.0 | 0.03 | Remainder | 6.67 | Mg: less than its lower limit of 0.005 mass % |
| A20 | 0.85 | 0.15 | 0.20 | 0.85 | 0.02 | 4.1 | 0.03 | Remainder | 4.82 | Cu: larger than its upper limit of 0.15 mass % |
| A21 | 0.85 | 0.15 | 0.0002 | 0.85 | 0.02 | 4.1 | 0.03 | Remainder | 4.82 | Cu: less than its lower limit of 0.001 mass % |

For each of the core materials listed in Table 1 and each of the cladding materials listed in Table 2, an aluminum alloy composite material for brazing shown in FIG. 1 was manufactured using a brazing material (JIS4045 alloy; Si: 10.5 mass %, Fe: 0.05 mass %, Cu: 0.05 mass %, Ti: 0.02 mass %, and the remainder of Al and unavoidable impurities). FIG. 1 is a cross-sectional view of the aluminum alloy composite material for brazing according to an example of the present invention. As shown in FIG. 1, the aluminum alloy composite material 4 includes a cladding material 2 and a brazing material 3 that are respectively formed on surfaces of a cladding material 1. Table 3 shows combinations of the core material and the cladding material in the aluminum alloy composite material, the thickness of each of the core material and the cladding material, the thickness of the brazing material, and the entire thickness of the composite material.

TABLE 3

| | No. | Core material | | Skin material | | Brazing | | Cladding ratio of | |
|---|---|---|---|---|---|---|---|---|---|
| | | Core material No. | Thickness (μm) | Skin material No. | Thickness (μm) | material Thickness (μm) | Entire Thickness (mm) | skin material (%) | Remarks |
| Examples | A1 | A1 | 105 | A1 | 30 | 15 | 0.15 | 20.0 | |
| | A2 | A1 | 105 | A2 | 30 | 15 | 0.15 | 20.0 | |
| | A3 | A2 | 110 | A3 | 25 | 15 | 0.15 | 16.7 | |
| | A4 | A2 | 105 | A4 | 30 | 15 | 0.15 | 20.0 | |
| | A5 | A3 | 105 | A1 | 30 | 15 | 0.15 | 20.0 | |
| | A6 | A3 | 110 | A3 | 25 | 15 | 0.15 | 16.7 | |
| | A7 | A3 | 105 | A4 | 30 | 15 | 0.15 | 20.0 | |
| | A8 | A4 | 105 | A11 | 30 | 15 | 0.15 | 20.0 | |
| | A9 | A4 | 105 | A12 | 30 | 15 | 0.15 | 20.0 | |
| | A10 | A5 | 115 | A13 | 20 | 15 | 0.15 | 13.3 | |
| Comparative Examples | A11 | A6 | 105 | A3 | 30 | 15 | 0.15 | 20.0 | Si in core material: less than its lower limit of 0.05 mass % |
| | A12 | A7 | 105 | A3 | 30 | 15 | 0.15 | 20.0 | Cu in core material: less than its lower limit of 0.2 mass % |
| | A13 | A8 | 105 | A3 | 30 | 15 | 0.15 | 20.0 | Mn in core material: less than its lower limit of 0.3 mass % |
| | A14 | A9 | 105 | A3 | 30 | 15 | 0.15 | 20.0 | Mg in core material: larger than its upper limit of 0.2 mass % |
| | A15 | A10 | 105 | A3 | 30 | 15 | 0.15 | 20.0 | Cr in core material: less than its preferable lower limit of 0.02 mass % |
| | A16 | A11 | 105 | A3 | 30 | 15 | 0.15 | 20.0 | Ti in core material: less than its lower limit of 0.02 mass % |
| | A17 | A12 | 105 | A3 | 30 | 15 | 0.15 | 20.0 | Si in core material: larger than its upper limit of 1.4 mass % |

TABLE 3-continued

| No. | Core material No. | Core material Thickness (μm) | Skin material No. | Skin material Thickness (μm) | Brazing material Thickness (μm) | Entire Thickness (mm) | Cladding ratio of skin material (%) | Remarks |
|---|---|---|---|---|---|---|---|---|
| A18 | A13 | 105 | A3 | 30 | 15 | 0.15 | 20.0 | Fe in core material: larger than its upper limit of 0.2 mass % |
| A19 | A14 | 105 | A3 | 30 | 15 | 0.15 | 20.0 | Cu in core material: larger than its upper limit of 1.0 mass % |
| A20 | A15 | 105 | A3 | 30 | 15 | 0.15 | 20.0 | Mn in core material: larger than its upper limit of 1.8 mass % |
| A21 | A16 | 105 | A3 | 30 | 15 | 0.15 | 20.0 | Ti in core material: larger than its upper limit of 0.3 mass % |
| A22 | A17 | 105 | A3 | 30 | 15 | 0.15 | 20.0 | Cr in core material: larger than its upper limit of 0.3 mass % |
| A23 | A18 | 105 | A3 | 30 | 15 | 0.15 | 20.0 | Cu + Si: larger than 2.0 |
| A24 | A3 | 105 | A5 | 30 | 15 | 0.15 | 20.0 | Si in skin material: less than its lower limit of 0.04 mass % |
| A25 | A3 | 105 | A6 | 30 | 15 | 0.15 | 20.0 | Si in skin material: larger than its upper limit of 0.9 mass % |
| A26 | A3 | 105 | A7 | 30 | 15 | 0.15 | 20.0 | Mn in skin material: less than its lower limit of 0.3 mass % |
| A27 | A3 | 105 | A7-2 | 30 | 15 | 0.15 | 20.0 | Mn in skin material: larger than its upper limit of 1.8 mass % |
| A28 | A3 | 105 | A8 | 30 | 15 | 0.15 | 20.0 | Zn/Si in skin material ≦4 |
| A29 | A3 | 105 | A9 | 30 | 15 | 0.15 | 20.0 | Zn in the skin material: less than its lower limit of 2 mass % |
| A30 | A3 | 105 | A10 | 30 | 15 | 0.15 | 20.0 | Zn in skin material: larger than its upper limit of 9 mass % |
| A31 | A3 | 105 | A14 | 30 | 15 | 0.15 | 20.0 | Fe in skin material: larger than its upper limit of 0.25 mass % |
| A32 | A3 | 105 | A15 | 30 | 15 | 0.15 | 20.0 | Fe in skin material: lower than its lower limit of 0.02 mass % |
| A33 | A3 | 105 | A6 | 30 | 15 | 0.15 | 20.0 | Cr in skin material: larger than its upper limit of 0.3 mass % |
| A34 | A3 | 105 | A17 | 30 | 15 | 0.15 | 20.0 | Cr in skin material: less than its lower limit of 0.01 mass % |
| A35 | A3 | 105 | A18 | 30 | 15 | 0.15 | 20.0 | Mg in skin material: less than its upper limit of 0.15 mass % |
| A36 | A3 | 105 | A19 | 30 | 15 | 0.15 | 20.0 | Mg in skin material: less than its lower limit of 0.005 mass % |
| A37 | A3 | 105 | A20 | 30 | 15 | 0.15 | 20.0 | Cu in skin material: larger than its upper limit of 0.15 mass % |
| A38 | A3 | 105 | A21 | 30 | 15 | 0.15 | 20.0 | Cu in skin material: less than its lower limit of 0.001 mass % |
| A39 | A3 | 127 | A3 | 8 | 15 | 0.15 | 5.3 | Cladding ratio of skin material: less than 6% |
| A40 | A3 | 85 | A3 | 50 | 15 | 0.15 | 33.3 | Cladding ratio of skin material: larger than 30% |

For each of the composite materials listed in Table 3, a brazeability test, a measurement of tensile strength, and an anticorrosion test were performed in the following manner. In the brazeability test, 5 g/m² of Nocolok flux was applied onto a brazing-material side surface of the aluminum alloy composite material and was then dried. Then, that aluminum alloy composite material was heated in a nitrogen atmosphere having a dew point of −40° C. under a condition in which the temperature was increased to 600° C. and was kept at 600° C. for two minutes.

Figure 2:
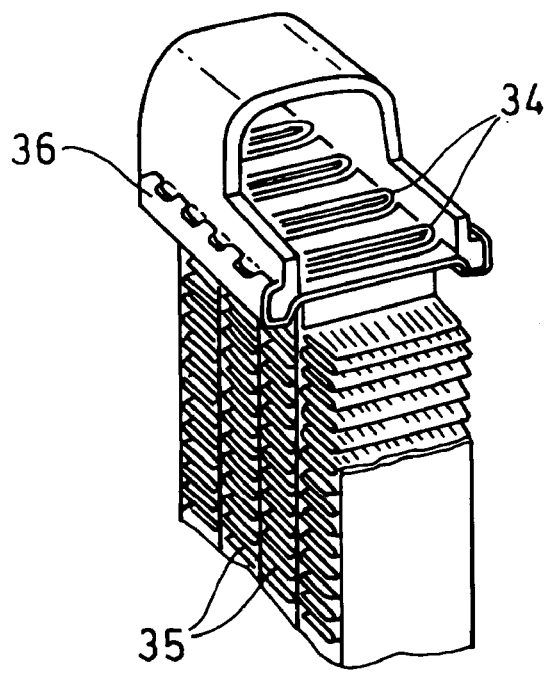
FIG. 2 is a perspective view showing a part of a tube of a radiator.
Figure 3:
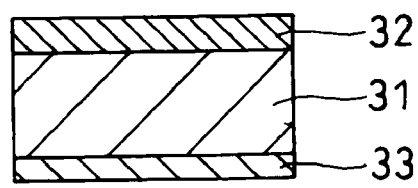
FIG. 3 is a cross-sectional view showing a laminated structure in the aluminum alloy composite material that forms the tube.

FIG. 2 is a perspective view showing a part of a tube of a radiator. In actual manufacturing of the radiator, brazing is performed in a state where the tube 34, a fin 35 for radiating heat, and a header 36 for connecting the tube 34 are assembled, as shown in FIG. 2. Moreover, the tube 34 is formed by a core material 31, a cladding material 32, and a brazing material 33, as shown in FIG. 3. In this case, the brazeability was evaluated based on a fluid coefficient obtained by a drop test ("drop type fluidity test" described in Aluminum Brazing Handbook, published by January, 1992, Japan Light Metal Welding and Construction Association, p. 126), considering simplification and quantification of the evaluation of brazeability.

The evaluation result is shown below in Table 4. In Table 4, the aluminum alloy composite material having a fluidity of 65% or more is shown with circle, whereas the aluminum alloy composite material having a fluidity less than 65% is shown with cross.

TABLE 4

| | No. | Brazeability (fluid coefficient) % | Tensile strength Mpa | Depth of corrosion on brazing material side μm | Depth of corrosion on skin material side μm | Reason why Comparative Example is inferior | Remarks |
|---|---|---|---|---|---|---|---|
| Examples | A1 | 70%○ | 162○ | ○ | ○ | | |
| | A2 | 70%○ | 160○ | ○ | ○ | | |
| | A3 | 70%○ | 164○ | ○ | ○ | | |
| | A4 | 70%○ | 159○ | ○ | ○ | | |
| | A5 | 70%○ | 163○ | ○ | ○ | | |
| | A6 | 70%○ | 165○ | ○ | ○ | | |
| | A7 | 70%○ | 166○ | ○ | ○ | | |
| | A8 | 70%○ | 159○ | ○ | ○ | | |
| | A9 | 70%○ | 160○ | ○ | ○ | | |
| | A10 | 70%○ | 159○ | ○ | ○ | | |
| Comparative Examples | A11 | 70%○ | 148X | ○ | ○ | Insufficient post-braze strength | Si in core material: less than its lower limit of 0.05 mass % |
| | A12 | 70%○ | 145X | ○ | ○ | Insufficient post-braze strength | Cu in core material: less than its lower limit of 0.2 mass % |
| | A13 | 70%○ | 146X | ○ | ○ | | Mn in core material: less than its lower limit of 0.3 mass % |
| | A14 | 60%X | 165○ | ○ | ○ | Insufficient brazeability in case of the core material containing Mg of 0.3 mass % | Mg in core material: larger than its upper limit of 0.2 mass % |
| | A15 | 70%○ | 158○ | ○ | ○ | Slightly insufficient strength | Cr in core material: less than its preferable lower limit, 0.02 mass % |
| | A16 | 70%○ | 162○ | X | ○ | Deterioration of corrosion resistance of core material | Ti in core material: less than its lower limit of 0.02 mass % |
| | A17 | — | — | — | — | Occurrence of melting of core material | Si in core material: larger than its upper limit of 1.4 mass % |
| | A18 | 70%○ | 162○ | X | ○ | Deterioration of corrosion resistance of core material | Fe in core material: larger than its upper limit of 0.2 mass % |
| | A19 | — | — | — | — | Occurrence of melting of core material | Cu in core material: larger than its upper limit of 1.0 mass % |
| | A20 | 70%○ | 164○ | ○ | ○ | Lowering of productivity | Mn in core material: larger than its upper limit of 1.8 mass % |
| | A21 | 70%○ | 162○ | ○ | ○ | Lowering of productivity | Ti in core material: larger than its upper limit of 0.3 mass % |
| | A22 | 70%○ | 163○ | ○ | ○ | Lowering of productivity | Cr in core material: larger than its upper limit of 0.3 mass % |
| | A23 | — | — | — | — | Occurrence of melting of core material | Cu + Si in core material: larger than its upper limit of 2.0 mass % |
| | A24 | 70%○ | 156X | ○ | ○ | Insufficient post-braze strength | Si in skin material: less than its lower limit of 0.04 mass % |
| | A25 | 70%○ | 167○ | ○ | X | Deterioration of corrosion resistance on skin material side | Si in skin material: larger than its upper limit of 0.9 mass % |

TABLE 4-continued

| No. | Brazeability (fluid coefficient) % | Tensile strength Mpa | Depth of corrosion on brazing material side μm | Depth of corrosion on skin material side μm | Reason why Comparative Example is inferior | Remarks |
|---|---|---|---|---|---|---|
| A26 | 70%○ | 157X | ○ | ○ | Insufficient post-braze strength | Mn in skin material: less than its lower limit of 0.3 mass % |
| A27 | 70%○ | 165○ | ○ | ○ | Lowering of the productivity | Mn in skin material: larger than its upper limit of 1.8 mass % |
| A28 | 70%○ | 166○ | ○ | X | Deterioration of corrosion resistance on skin material side | Zn/Si in skin material ≦4 |
| A29 | 70%○ | 164○ | ○ | X | Deterioration of corrosion resistance on skin material side | Zn in skin material: less than its lower limit of 2 mass % |
| A30 | 70%○ | 164○ | ○ | X | Deterioration of corrosion resistance on skin material side | Zn in skin material: larger than its upper limit of 9 mass % |
| A31 | 70%○ | 160○ | ○ | X | Deterioration of corrosion resistance on skin material side | Fe in skin material: larger than its upper limit of 0.25 mass % |
| A32 | 70%○ | 155 | ○ | ○ | Insufficient post-braze strength | Fe in skin material: less than its lower limit of 0.02 mass % |
| A33 | 70%○ | 161○ | ○ | X | Deterioration of corrosion resistance on skin material side | Cr in skin material: larger than its upper limit of 0.3 mass % |
| A34 | 70%○ | 157X | ○ | X | Insufficient post-braze strength, deterioration of corrosion resistance on skin material side | Cr in skin material: less than its lower limit of 0.01 mass % |
| A35 | 70%○ | 167○ | ○ | ○ | Deterioration of brazeability at a brazing site on skin material side | Mg in skin material: larger than its upper limit of 0.15 mass % |
| A36 | 70%○ | 157X | ○ | ○ | Insufficient post-braze strength | Mg in skin material: less than its lower limit of 0.005 mass % |
| A37 | 70%○ | 168○ | ○ | X | Deterioration of corrosion resistance on skin material side | Cu in skin material: larger than its upper limit of 0.15 mass % |
| A38 | 70%○ | 157X | ○ | ○ | Deterioration of post-braze strength | Cu in skinmaterial: less than its lower limit of 0.001 mass % |
| A39 | 70%○ | 162○ | ○ | X | Deterioration of corrosion resistance on skin material side | Cladding ratio of skin material: less than 6% |
| A40 | 70%○ | 160○ | X | ○ | Deterioration of corrosion resistance on brazing material side | Cladding ratio of skin material: larger than 30% |

In order to obtain the post-braze strength, a tensile test (JISZ2241) was performed at a room temperature for the aluminum alloy composite material that was heated in a similar manner to that in the aforementioned brazeability test. The result of the tensile test is also shown in Table 4. The post-braze strength exceeding 158 MPa is shown with circle, whereas the post-braze strength equal to or less than 158 MPa is shown with cross.

In a corrosion test on the brazing material side, CASS test was performed for 250 hours in a row for the aluminum alloy composite material that was heated in a similar manner to that in the brazeability test. The result of this test is also shown in Table 4. In a field of "Depth of corrosion on brazing material side" in Table 4, the composite material in which the depth of the corrosion on the brazing material side was equal to or smaller than 70 µm is shown with circle, while the composite material in which that depth exceeded 70 µm is shown with cross.

In order to obtain the corrosion resistance on the cladding material side, a corrosion test was performed for the cladding material side of the aluminum alloy composite material. In the corrosion test on the cladding material side, a corrosion test was performed for the aluminum alloy composite material that was heated in a similar manner to that in the brazeability test, by using artificial water (Cl: 300 ppm by mass, $SO_4$: 100 ppm by mass, and Cu: 5 ppm by mass). While the aluminum alloy composite material was immersed in the artificial water, a cycle test that includes a process for keeping the aluminum alloy composite material at 88° C. for 8 hours (containing a heating time from a room temperature to 88° C.) and a process for keeping the aluminum alloy composite material at a room temperature for 16 hours (containing a cooling time from 88° C. to the room temperature) was performed for 39 days. The result of this test is also shown in Table 4. In a field of "Depth of corrosion on cladding material side" in Table 4, the composite material in which the depth of corrosion on the cladding material side was equal to or less than 30 µm is shown with circle, whereas the composite material in which that depth exceeded 30 µm is shown with cross.

As shown in Table 4, Examples A1 to A10 of the present invention were good in all the brazeability, the tensile strength, the corrosion depth on the brazing material side, and the corrosion depth on the cladding material side. On the other hand, Comparative Example A11 was insufficient in the post-braze strength, because the amount of Si in the core material was less than its lower limit. For Comparative Example A12, the post-braze strength was insufficient, because the amount of Cu in the core material was less than its lower limit. For Comparative Example A13, the post-braze strength was not sufficient, because the amount of Mn in the core material was less than its lower limit. For Comparative Example A14, the brazeability was not good, because the amount of Mg in the core material exceeded its upper limit. For Comparative Example A15, the strength was slightly inferior, because the amount of Cr in the core material was less than its lower limit. For Comparative Example A16, the corrosion resistance of the core material was deteriorated, because the amount of Ti in the core material was less than its lower limit. For Comparative Example A17, melting of the core material occurred, because the amount of Si in the core material exceeded its upper limit. For Comparative Example A18, the corrosion resistance of the core material was deteriorated, because the amount of Fe in the core material exceeded its upper limit. For Comparative Example A19, melting of the core material occurred, because the amount of Cu in the core material exceeded its upper limit. For Comparative Example A20, the productivity was deteriorated, because the amount of Mn in the core material exceeded its upper limit. For Comparative Example A21, the productivity was deteriorated, because the amount of Ti in the core material exceeded its upper limit. For Comparative Example A22, the productivity was deteriorated, because the amount of Cr in the core material exceeded its upper limit. For Comparative Example A23, melting of the core material occurred, because the total amount of Cu and Si in the core material exceeded its upper limit.

For Comparative Example A24, the post-braze strength was not sufficient, because the amount of Si in the cladding material was less than its lower limit. For Comparative Example A25, the corrosion resistance on the cladding material side was deteriorated, because the amount of Si in the cladding material exceeded its upper limit. For Comparative Example A26, the post-braze strength was not sufficient, because the amount of Mn in the cladding material was less than its lower limit. For Comparative Example A27, the productivity was lowered, because the amount of Mn in the cladding material exceeded its upper limit. For Comparative Example A28, the corrosion resistance on the cladding material side was deteriorated, because Zn/Si in the cladding material was less than its lower limit. For Comparative Example A29, the corrosion resistance on the cladding material side was deteriorated, because the amount of Zn in the cladding material was less than its lower limit. For Comparative Example A30, the corrosion resistance on the cladding material side was degraded, because the amount of Zn in the cladding material exceeded its upper limit. For Comparative Example A31, the corrosion resistance on the cladding material side was deteriorated, because the amount of Fe in the cladding material exceeded its upper limit. For Comparative Example A32, the post-braze strength was not sufficient, because the amount of Fe in the cladding material was less than its lower limit. For Comparative Example A33, the corrosion resistance on the cladding material side was deteriorated, because the amount of Cr in the cladding material exceeded its upper limit. For Comparative Example A34, the post-braze strength was not sufficient and the corrosion resistance on the cladding material side was deteriorated, because the amount of Cr in the cladding material was less than its lower limit. For Comparative Example A35, the brazeability at a brazing site on the cladding material side was deteriorated, because the amount of Mg in the cladding material exceeded its upper limit. For Comparative Example A36, the post-braze strength was not sufficient, because the amount of Mg in the cladding material was less than its lower limit. For Comparative Example A37, the corrosion resistance on the cladding material side was deteriorated, because the amount of Cu in the cladding material exceeded its upper limit. For Comparative Example A38, the post-braze strength was deteriorated, because the amount of Cu in the cladding material was less than its lower limit. For Comparative Example A39, the corrosion resistance on the cladding material side was deteriorated, because the cladding ratio of the cladding material was less than its lower limit. For Comparative Example A40, the corrosion resistance on the brazing material side was deteriorated, because the cladding ratio of the cladding material exceeded its upper limit.

Examples of the Second Aspect of the Present Invention

Effects of Examples of the second aspect of the present invention are now described specifically, comparing with Comparative Examples departing from the scope of the second aspect of the present invention.

Table 5 shows the composition of the core material and Table 6 shows the composition of the cladding material. In Table 5, Core materials Nos. B1 to B5 are Examples of the present invention and Core materials Nos. B6 to B18 are Comparative Examples. In Table 6, Cladding materials Nos. B1 to B4 and B11 to B13 are Examples of the present invention and Cladding materials Nos. B5 to B10 are Comparative Examples departing from the scope of the claims reciting the second aspect of the present invention.

TABLE 5

| Core material No. | Core material composition (mass %) | | | | | | | | Remarks | |
|---|---|---|---|---|---|---|---|---|---|---|
| | Si | Fe | Cu | Mn | Mg | Cr | Ti | Al | | |
| B1 | 0.4 | 0.05 | 0.70 | 1.3 | 0.0 | 0.1 | 0.12 | Remainder | | Examples |
| B2 | 0.8 | 0.05 | 0.70 | 1.3 | 0.0 | 0.1 | 0.12 | Remainder | | |
| B3 | 1.0 | 0.05 | 0.70 | 1.3 | 0.0 | 0.1 | 0.12 | Remainder | | |
| B4 | 0.8 | 0.05 | 0.30 | 1.3 | 0.0 | 0.1 | 0.12 | Remainder | | |
| B5 | 0.8 | 0.05 | 0.90 | 1.3 | 0.0 | 0.1 | 0.12 | Remainder | | |
| B6 | 0.03 | 0.05 | 0.70 | 1.3 | 0.0 | 0.1 | 0.12 | Remainder | Si: less than its lower limit of 0.05 mass % | Comparative examples |
| B7 | 0.8 | 0.05 | 0.15 | 1.3 | 0.0 | 0.1 | 0.12 | Remainder | Cu: less than its lower limit of 0.2 mass % | |
| B8 | 0.8 | 0.05 | 0.70 | 0.2 | 0.0 | 0.1 | 0.12 | Remainder | Mn: less than its lower limit of 0.3 mass % | |
| B9 | 0.8 | 0.05 | 0.70 | 1.3 | 0.3 | 0.1 | 0.12 | Remainder | Mg: larger than its upper limit of 0.2 mass % | |
| B10 | 0.8 | 0.05 | 0.70 | 1.3 | 0.0 | 0.0 | 0.12 | Remainder | Cr: less than its preferable lower limit of 0.02 mass % | |
| B11 | 0.8 | 0.05 | 0.70 | 1.3 | 0.0 | 0.1 | 0.00 | Remainder | Ti: less than its lower limit of 0.02 mass % | |
| B12 | 1.4 | 0.05 | 0.70 | 1.3 | 0.0 | 0.1 | 0.12 | Remainder | Si: larger than its upper limit of 1.4 mass % | |
| B13 | 0.8 | 0.3 | 0.70 | 1.3 | 0.0 | 0.1 | 0.12 | Remainder | Fe: larger than its upper limit of 0.2 mass % | |
| B14 | 0.8 | 0.05 | 1.1 | 1.3 | 0.0 | 0.1 | 0.12 | Remainder | Cu: larger than its upper limit of 1.0 mass % | |
| B15 | 0.8 | 0.05 | 0.70 | 1.9 | 0.0 | 0.1 | 0.12 | Remainder | Mn: larger than its upper limit of 1.8 mass % | |
| B16 | 0.8 | 0.05 | 0.70 | 1.3 | 0.0 | 0.1 | 0.31 | Remainder | Ti: larger than its upper limit of 0.3 mass % | |
| B17 | 0.8 | 0.05 | 0.70 | 1.3 | 0.0 | 0.4 | 0.12 | Remainder | Cr: larger than its upper limit of 0.3 mass % | |
| B18 | 1.2 | 0.05 | 0.90 | 1.3 | 0.0 | 0.1 | 0.12 | Remainder | Cu + Si: larger than its upper limit of 2.0 mass % | |

TABLE 6

| Skin material No. | Skin material composition (mass %) | | | | | | | | Zn/Si | Remarks | |
|---|---|---|---|---|---|---|---|---|---|---|---|
| | Si | Fe | Cu | Mn | Mg | Zn | Cr | Al | | | |
| B1 | 0.8 | 0.17 | 0.10 | 0.89 | 0.01 | 4.5 | 0.03 | Remainder | 5.6 | | Examples |
| B2 | 0.04 | 0.17 | 0.02 | 0.9 | 0.02 | 4.5 | 0.05 | Remainder | 113 | | |
| B3 | 0.80 | 0.20 | 0.02 | 0.9 | 0.01 | 4.1 | 0.03 | Remainder | 5.1 | | |
| B4 | 0.6 | 0.20 | 0.03 | 0.8 | 0.08 | 3.0 | 0.15 | Remainder | 5.0 | | |
| B5 | 0.4 | 0.17 | 0.08 | 0.4 | 0.01 | 4.1 | 0.03 | Remainder | 136.7 | Si: less than its lower limit of 0.5 mass % | Comparative examples |
| B6 | 1.3 | 0.19 | 0.08 | 0.4 | 0.02 | 4.5 | 0.05 | Remainder | 4.5 | Si: larger than its upper limit of 1.2 mass % | |
| B7 | 0.1 | 0.22 | 0.03 | 0.2 | 0.10 | 3.2 | 0.15 | Remainder | 3.2 | Mn: less than its lower limit of 0.3 mass % | |
| B7-2 | 0.8 | 0.18 | 0.10 | 2.3 | 0.02 | 4.2 | 0.15 | Remainder | 5.25 | Mn: larger than its upper limit of 1.8 mass % | |
| B8 | 0.85 | 0.20 | 0.08 | 1.1 | 0.12 | 3.2 | 0.03 | Remainder | 3.7 | Zn/Si ratio: less than 4 | |
| B9 | 0.4 | 0.21 | 0.03 | 0.4 | 0.11 | 1.8 | 0.05 | Remainder | 4.5 | Zn: less than its lower limit of 2 mass % | |
| B10 | 0.25 | 0.22 | 0.03 | 0.6 | 0.03 | 9.5 | 0.15 | Remainder | 38 | Zn: larger than its upper limit of 9 mass % | |

TABLE 6-continued

| Skin material No. | Skin material composition (mass %) | | | | | | | | Zn/Si | Remarks | |
|---|---|---|---|---|---|---|---|---|---|---|---|
| | Si | Fe | Cu | Mn | Mg | Zn | Cr | Al | | | |
| B11 | 0.08 | 0.18 | 0.12 | 0.9 | 0.10 | 3.8 | 0.15 | Remainder | 47.5 | | Examples |
| B12 | 0.75 | 0.18 | 0.02 | 0.5 | 0.02 | 4.5 | 0.10 | Remainder | 6.0 | | |
| B13 | 0.35 | 0.19 | 0.03 | 0.5 | 0.05 | 3.3 | 0.10 | Remainder | 9.4 | | |
| B14 | 0.8 | 0.30 | 0.04 | 0.9 | 0.10 | 4.2 | 0.10 | Remainder | 5.25 | Fe: larger than its upper limit of 0.25 mass % | Comparative examples |
| B15 | 0.8 | 0.01 | 0.01 | 0.9 | 0.08 | 4.2 | 0.03 | Remainder | 5.25 | Fe: less than its lower limit of 0.02 mass % | |
| B16 | 0.75 | 0.18 | 0.11 | 0.85 | 0.09 | 5.2 | 0.50 | Remainder | 6.93 | Cr: larger than its upper limit of 0.30 mass % | |
| B17 | 0.75 | 0.18 | 0.12 | 0.85 | 0.01 | 5.2 | 0.005 | Remainder | 6.93 | Cr: less than its lower limit of 0.01 mass % | |
| B18 | 0.6 | 0.16 | 0.03 | 0.85 | 0.2 | 4.0 | 0.03 | Remainder | 6.67 | Mg: larger than its upper limit of 0.15 mass % | |
| B19 | 0.6 | 0.16 | 0.05 | 0.85 | 0.002 | 4.0 | 0.03 | Remainder | 6.67 | Mg: less than its lower limit of 0.005 mass % | |
| B20 | 0.85 | 0.15 | 0.20 | 0.85 | 0.02 | 4.1 | 0.03 | Remainder | 4.82 | Cu: larger than its upper limit of 0.15 mass % | |
| B21 | 0.85 | 0.15 | 0.0002 | 0.85 | 0.02 | 4.1 | 0.03 | Remainder | 4.82 | Cu: less than its lower limit of 0.001 mass % | |
| B22 | Content: 0.8, Amount of solid solution: 0.3 | 0.17 | 0.10 | 0.89 | 0.01 | 4.5 | 0.03 | Remainder | 5.6 | Average Si composition ≦ (Si content) × 0.5 | Examples |
| B23 | Content: 0.8, Amount of solid solution: 0.45 | 0.17 | 0.10 | 0.89 | 0.01 | 4.5 | 0.03 | Remainder | 5.6 | Average Si composition > (Si content) × 0.5 | Comparative examples |

For each of the core materials listed in Table 5 and each of the cladding materials listed in Table 6, an aluminum alloy composite material for brazing shown in FIG. 1 was manufactured using a brazing material (JIS4045 alloy; Si: 10.5 mass %, Fe: 0.05 mass %, Cu: 0.05 mass %, Ti: 0.02 mass %, the remainder was formed from Al and unavoidable impurities). Table 7 shows combinations of the core material and the cladding material in the aluminum alloy composite material, the thickness of each of the core material and the cladding material, the thickness of the brazing material, and the entire thickness of the composite material.

TABLE 7

| | No. | Core material No. | Core material Thickness (μm) | Skin material No. | Skin material Thickness (μm) | Brazing material Thickness (μm) | Entire thickness (mm) | Cladding ratio of skin material (%) | Remarks |
|---|---|---|---|---|---|---|---|---|---|
| Examples | B1 | B1 | 105 | B1 | 30 | 15 | 0.15 | 20.0 | |
| | B2 | B1 | 105 | B2 | 30 | 15 | 0.15 | 20.0 | |
| | B3 | B2 | 110 | B3 | 25 | 15 | 0.15 | 16.7 | |
| | B4 | B2 | 105 | B4 | 30 | 15 | 0.15 | 20.0 | |
| | B5 | B3 | 105 | B1 | 30 | 15 | 0.15 | 20.0 | |
| | B6 | B3 | 110 | B3 | 25 | 15 | 0.15 | 16.7 | |
| | B7 | B3 | 105 | B4 | 30 | 15 | 0.15 | 20.0 | |
| | B8 | B4 | 105 | B11 | 30 | 15 | 0.15 | 20.0 | |
| | B9 | B4 | 105 | B12 | 30 | 15 | 0.15 | 20.0 | |
| | B10 | B5 | 115 | B13 | 20 | 15 | 0.15 | 13.3 | |

TABLE 7-continued

| No. | | Core material | | Skin material | | Brazing material Thickness (μm) | Entire thickness (mm) | Cladding ratio of skin material (%) | Remarks |
|---|---|---|---|---|---|---|---|---|---|
| | | Core material No. | Thickness (μm) | Skin material No. | Thickness (μm) | | | | |
| Comparative Examples | B11 | B6 | 105 | B3 | 30 | 15 | 0.15 | 20.0 | Si in core material: less than its lower limit of 0.05 mass % |
| | B12 | B7 | 105 | B3 | 30 | 15 | 0.15 | 20.0 | Cu in core material: less than its lower limit of 0.2 mass % |
| | B13 | B8 | 105 | B3 | 30 | 15 | 0.15 | 20.0 | Mn in core material: less than its lower limit of 0.3 mass % |
| | B14 | B9 | 105 | B3 | 30 | 15 | 0.15 | 20.0 | Mg in core material: larger than its upper limit of 0.2 mass % |
| | B15 | B10 | 105 | B3 | 30 | 15 | 0.15 | 20.0 | Cr in core material: less than its preferable lower limit of 0.02 mass % |
| | B16 | B11 | 105 | B3 | 30 | 15 | 0.15 | 20.0 | Ti in core material: less than its lower limit of 0.02 mass % |
| | B17 | B12 | 105 | B3 | 30 | 15 | 0.15 | 20.0 | Si in core material: larger than its upper limit of 1.4 mass % |
| | B18 | B13 | 105 | B3 | 30 | 15 | 0.15 | 20.0 | Fe in core material: larger than its upper limit of 0.2 mass % |
| | B19 | B14 | 105 | B3 | 30 | 15 | 0.15 | 20.0 | Cu in core material: larger than its upper limit of 1.0 mass % |
| | B20 | B15 | 105 | B3 | 30 | 15 | 0.15 | 20.0 | Mn in core material: larger than its upper limit of 1.8 mass % |
| | B21 | B16 | 105 | B3 | 30 | 15 | 0.15 | 20.0 | Ti in core material: larger than its upper limit of 0.3 mass % |
| | B22 | B17 | 105 | B3 | 30 | 15 | 0.15 | 20.0 | Cr in core material: larger than its upper limit of 0.3 mass % |
| | B23 | B18 | 105 | B3 | 30 | 15 | 0.15 | 20.0 | Cu + Si in core material: larger than its upper limit of 2.0 mass % |
| | B24 | B3 | 105 | B5 | 30 | 15 | 0.15 | 20.0 | Si in skin material: less than its lower limit of 0.5 mass % |
| | B25 | B3 | 105 | B6 | 30 | 15 | 0.15 | 20.0 | Si in skin material: larger than its upper limit of 1.2 mass % |
| | B26 | B3 | 105 | B7 | 30 | 15 | 0.15 | 20.0 | Mn in skin material: less than its lower limit of 0.3 mass % |
| | B27 | B3 | 105 | B7-2 | 30 | 15 | 0.15 | 20.0 | Mn in skin material: larger than its upper limit of 1.8 mass % |
| | B28 | B3 | 105 | B8 | 30 | 15 | 0.15 | 20.0 | Zn/Si in skin material ≦4 |
| | B29 | B3 | 105 | B9 | 30 | 15 | 0.15 | 20.0 | Zn in skin material: less than its lower limit of 2 mass % |
| | B30 | B3 | 105 | B10 | 30 | 15 | 0.15 | 20.0 | Zn in skin material: larger than its upper limit of 9 mass % |
| | B31 | B3 | 105 | B14 | 30 | 15 | 0.15 | 20.0 | Fe in skin material: larger than its upper limit of 0.25 mass % |
| | B32 | B3 | 105 | B15 | 30 | 15 | 0.15 | 20.0 | Fe in skin material: less than its lower limit of 0.02 mass % |
| | B33 | B3 | 105 | B16 | 30 | 15 | 0.15 | 20.0 | Cr in skin material: larger than its upper limit of 0.3 mass % |

TABLE 7-continued

|  | No. | Core material No. | Thickness (μm) | Skin material No. | Thickness (μm) | Brazing material Thickness (μm) | Entire thickness (mm) | Cladding ratio of skin material (%) | Remarks |
|---|---|---|---|---|---|---|---|---|---|
|  | B34 | B3 | 105 | B17 | 30 | 15 | 0.15 | 20.0 | Cr in skin material: less than its lower limit of 0.01 mass % |
|  | B35 | B3 | 105 | B18 | 30 | 15 | 0.15 | 20.0 | Mg in skin material: larger than its upper limit of 0.15 mass % |
|  | B36 | B3 | 105 | B19 | 30 | 15 | 0.15 | 20.0 | Mg in skin material: less than its lower limit of 0.005 mass % |
|  | B37 | B3 | 105 | B20 | 30 | 15 | 0.15 | 20.0 | Cu in skin material: larger than its upper limit of 0.15 mass % |
|  | B38 | B3 | 105 | B21 | 30 | 15 | 0.15 | 20.0 | Cu in skin material: less than its lower limit of 0.001 mass % |
|  | B39 | B3 | 127 | B3 | 8 | 15 | 0.15 | 5.3 | Cladding ratio of skin material: less than 6% |
|  | B40 | B3 | 85 | B3 | 50 | 15 | 0.15 | 33.3 | Cladding ratio of skin material: larger than 30% |
| Examples | B41 | B3 | 105 | B22 | 30 | 15 | 0.15 | 20.0 |  |
| Comparative Examples | B42 | B3 | 105 | B23 | 30 | 15 | 0.15 | 20.0 | Average Si composition > (Si content) × 0.5 |
| Examples | B43 | B3 | 105 | B22 | 30 | 15 | 0.15 | 20.0 |  |

In Table 7, a cooling rate during brazing was 30 to 70° C./minute for Examples B1 to B10 and B41 and Comparative Examples B11 to B40 and B42. Moreover, the cooling rate during brazing was 120° C./minute for Comparative Example B42.

For each of the composite materials listed in Table 7, a brazeability test, a measurement of tensile strength, and an anticorrosion test were performed in the following manner. In the brazeability test, 5 g/m² of Nocolok flux was applied onto a brazing-material side surface of the aluminum alloy composite material and was then dried. Then, that aluminum alloy composite material was heated in a nitrogen atmosphere having a dew point of −40° C. under a condition in which the temperature was increased to 600° C. and was kept at 600° C. for two minutes.

The brazeability was evaluated by a fluid coefficient obtained by a drop test ("drop type fluidity test" described in Aluminum Brazing Handbook, published by January, 1992, Japan Light Metal Welding & Construction Association, p. 126), considering simplification and quantification of the evaluation of the brazeablity.

The evaluation result is shown below in Table 8. In Table 8, the aluminum alloy composite material having a fluidity of 65% or more is shown with circle, whereas the aluminum alloy composite material having a fluidity less than 65% is shown with cross.

TABLE 8

|  | No. | Brazeability (fluid coefficient) % | Tensile strength MPa | Depth of corrosion on brazing material side μm | Depth of corrosion on skin material side μm | Reason why Comparative Example is inferior | Remarks |
|---|---|---|---|---|---|---|---|
| Examples | B1 | 70%○ | 162○ | ○ | ○ |  |  |
|  | B2 | 70%○ | 160○ | ○ | ○ |  |  |
|  | B3 | 70%○ | 164○ | ○ | ○ |  |  |
|  | B4 | 70%○ | 159○ | ○ | ○ |  |  |
|  | B5 | 70%○ | 163○ | ○ | ○ |  |  |
|  | B6 | 70%○ | 165○ | ○ | ○ |  |  |
|  | B7 | 70%○ | 166○ | ○ | ○ |  |  |
|  | B8 | 70%○ | 159○ | ○ | ○ |  |  |
|  | B9 | 70%○ | 160○ | ○ | ○ |  |  |
|  | B10 | 70%○ | 159○ | ○ | ○ |  |  |
| Comparative Examples | B11 | 70%○ | 148X | ○ | ○ | Insufficient post-braze strength | Si in core material: less than its lower limit of 0.05 mass % |
|  | B12 | 70%○ | 145X | ○ | ○ | Insufficient post-braze strength | Cu in core material: less than its lower limit of 0.2 mass % |
|  | B13 | 70%○ | 146X | ○ | ○ |  | Mn in core material: less than its lower limit of 0.3 mass % |

TABLE 8-continued

| No. | Brazeability (fluid coefficient) % | Tensile strength MPa | Depth of corrosion on brazing material side μm | Depth of corrosion on skin material side μm | Reason why Comparative Example is inferior | Remarks |
|---|---|---|---|---|---|---|
| B14 | 60%X | 165○ | ○ | ○ | Insufficient brazeability in case of core material containing Mg of 0.3 mass % | Mg in core material: larger than its upper limit of 0.2 mass % |
| B15 | 70%○ | 158○ | ○ | ○ | Slightly insufficient strength | Cr in core material: less than its preferable lower limit of 0.02 mass % |
| B16 | 70%○ | 162○ | X | ○ | Deterioration of corrosion resistance of core material | Ti in core material: less than its lower limit of 0.02 mass % |
| B17 | — | — | — | — | Occurrence of melting of core material | Si in core material: larger than its upper limit of 1.4 mass % |
| B18 | 70%○ | 163○ | X | ○ | Deterioration of corrosion resistance of core material | Fe in core material: larger than its upper limit of 0.2 mass % |
| B19 | — | — | — | — | Occurrence of melting of core material | Cu in core material: larger than its upper limit of 1.0 mass % |
| B20 | 70%○ | 164○ | ○ | ○ | Lowering of the productivity | Mn in core material: larger than its upper limit of 1.8 mass % |
| B21 | 70%○ | 162○ | ○ | ○ | Lowering of the productivity | Ti in core material: larger than its upper limit of 0.3 mass % |
| B22 | 70%○ | 163○ | ○ | ○ | Lowering of the productivity | Cr in core material: larger than its upper limit of 0.3 mass % |
| B23 | — | — | — | — | Occurrence of melting of core material | Cu + Si in core material: larger than its upper limit of 2.0 mass % |
| B24 | 70%○ | 156X | ○ | ○ | Insufficient post-braze strength | Si in skin material: less than its lower limit of 0.04 mass % |
| B25 | 70%○ | 167○ | ○ | X | Deterioration of corrosion resistance on skin material side | Si in skin material: larger than its upper limit of 0.9 mass % |
| B26 | 70%○ | 157X | ○ | ○ | Insufficient post-braze strength | Mn in skin material: less than its lower limit of 0.3 mass % |
| B27 | 70%○ | 165○ | ○ | ○ | Lowering of the productivity | Mn in skin material: larger than its upper limit of 1.8 mass % |
| B28 | 70%○ | 166○ | ○ | X | Deterioration of corrosion resistance on skin material side | Zn/Si in skin material ≦4 |
| B29 | 70%○ | 164○ | ○ | X | Deterioration of corrosion resistance on skin material side | Zn in skin material: less than its lower limit of 2 mass % |
| B30 | 70%○ | 164○ | ○ | X | Deterioration of corrosion resistance on skin material side | Zn in skin material: larger than its upper limit of 9 mass % |
| B31 | 70%○ | 160○ | ○ | X | Deterioration of corrosion resistance on skin material side | Fe in skin material: larger than its upper limit of 0.25 mass % |
| B32 | 70%○ | 155 | ○ | ○ | Insufficient post-braze strength | Fe in skin material: less than its lower limit of 0.02 mass % |
| B33 | 70%○ | 161○ | ○ | X | Deterioration of corrosion resistance on skin material side | Cr in skin material: larger than its upper limit of 0.3 mass % |
| B34 | 70%○ | 157X | ○ | X | Insufficient post-braze strength, deterioration of corrosion resistance on skin material side | Cr in skin material: less than its lower limit of 0.01 mass % |
| B35 | 70%○ | 167○ | ○ | ○ | Deterioration of brazeability at a brazing site on skin material side | Mg in skin material: larger than its upper limit of 0.15 mass % |
| B36 | 70%○ | 157X | ○ | ○ | Insufficient post-braze strength | Mg in skin material: less than its lower limit of 0.005 mass % |
| B37 | 70%○ | 168○ | ○ | X | Deterioration of corrosion resistance on skin material side | The amount of Cu in skin material: larger than its upper limit of 0.15 mass % |
| B38 | 70%○ | 157X | ○ | ○ | Deterioration of post-braze strength | Cu in skin material: less than its lower limit of 0.001 mass % |

TABLE 8-continued

| No. | Brazeability (fluid coefficient) % | Tensile strength MPa | Depth of corrosion on brazing material side μm | Depth of corrosion on skin material side μm | Reason why Comparative Example is inferior | Remarks |
|---|---|---|---|---|---|---|
| B39 | 70%○ | 162○ | ○ | X | Deterioration of corrosion resistance on skin material side | Cladding ratio of skin material: less than 6% |
| B40 | 70%○ | 160○ | X | ○ | Deterioration of corrosion resistance on brazing material side | Cladding ratio of skin material: larger than 30% |
| Examples B41 | 70%○ | 162○ | ○ | ◎ | | Small amount of grain boundary precipitation in skin material |
| Comparative Examples B42 | 70%○ | 163○ | ○ | ○ | | |
| Examples B43 | 70%○ | 163○ | ○ | ◎ | | Small amount of grain boundary precipitation in skin material |

In order to obtain the post-braze strength, a tensile test (JISZ2241) was performed for the aluminum alloy composite material that was heated during brazing in a similar manner to that in the aforementioned brazeability test. The result of the tensile test is also shown in Table 8. The post-braze strength exceeding 158 MPa is shown with circle, whereas the post-braze strength equal to or less than 158 MPa is shown with cross.

In a corrosion test on the brazing material side, CASS test Item (5) of JISH8681) was performed for 250 hours in a row for the aluminum alloy composite material that was heated in a similar manner to that in the brazeability test. The result of this test is also shown in Table 8. In a field of "Depth of corrosion on brazing material side" in Table 8, the composite material in which the depth of the corrosion on the brazing material side was equal to or smaller than 70 μm is shown with circle, while the composite material in which that depth exceeded 70 μm is shown with cross.

In order to obtain the corrosion resistance on the cladding material side, a corrosion test was performed for the cladding material side of the aluminum alloy composite material. In the corrosion test on the cladding material side, a corrosion test was performed for the aluminum alloy composite material that was heated in a similar manner to that in the brazeability test, by using artificial water (Cl: 300 ppm by mass, $SO_4$: 100 ppm by mass, and Cu: 5 ppm by mass). While the aluminum alloy composite material was immersed in the artificial water, a cycle test that includes a process for keeping the aluminum alloy composite material at 88° C. for 8 hours (containing a heating time from a room temperature to 88° C.) and a process for keeping the aluminum alloy composite material at a room temperature for 16 hours (containing a cooling time from 88° C. to the room temperature) was performed for 30 days. A 30-days corrosion test and a 50-days corrosion test were performed in the aforementioned procedure. The result is shown in Table 8. In a field of "Depth of corrosion on cladding material side" in Table 8, the composite material in which the depth of corrosion on the cladding material side after 30 days was equal to or less than 30 μm is shown with circle, the composite material in which that depth after 30 days exceeded 30 μm is shown with cross, and the composite material in which that depth did not exceed 30 μm even after 50 days is shown with double circle. That is, the composite material in which the depth of corrosion in the cladding material did not exceed 30 μm after 30 days but was equal to or larger than 30 μm after 50 days is shown with circle.

As shown in Table 8, Examples B1 to B10 of the present invention were good in all the brazeability, the tensile strength, the corrosion depth on the brazing material side, and the corrosion depth on the cladding material side. On the other hand, Comparative Example B11 was insufficient in the post-braze strength because the amount of Si in the core material was less than its lower limit. For Comparative Example B12, the post-braze strength was insufficient, because the amount of Cu in the core material was less than its lower limit. For Comparative Example B13, the post-braze strength was not sufficient, because the amount of Mn in the core material was less than its lower limit. For Comparative Example B14, the brazeability was not good, because the amount of Mg in the core material exceeded its upper limit. For Comparative Example B15, the strength was slightly inferior, because the amount of Cr in the core material was less than its lower limit. For Comparative Example B16, the corrosion resistance of the core material was deteriorated, because the amount of Ti in the core material was less than its lower limit. For Comparative Example B17, melting of the core material occurred, because the amount of Si in the core material exceeded its upper limit. For Comparative Example B18, the corrosion resistance of the core material was deteriorated, because the amount of Fe in the core material exceeded its upper limit. For Comparative Example B19, melting of the core material occurred, because the amount of Cu in the core material exceeded its upper limit. For Comparative Example B20, the productivity was lowered, because the amount of Mn in the core material exceeded its upper limit. For Comparative Example B21, the productivity was lowered, because the amount of Ti in the core material exceeded its upper limit. For Comparative Example B22, the productivity was lowered, because the amount of Cr in the core material exceeded its upper limit. For Comparative Example B23, melting of the core material occurred, because the total amount of Cu and Si in the core material exceeded its upper limit.

For Comparative Example B24, the post-braze strength was not sufficient, because the amount of Si in the cladding material was less than its lower limit. For Comparative Example B25, the corrosion resistance on the cladding material side was deteriorated, because the amount of Si in the cladding material exceeded its upper limit. For Comparative Example B26, the post-braze strength was not sufficient, because the amount of Mn in the cladding material was less than its lower limit. For Comparative Example B27, the productivity was lowered, because the amount of Mn in the cladding material exceeded its upper limit. For Comparative Example B28, the corrosion resistance on the cladding material side was deteriorated, because Zn/Si in the cladding material was less than its lower limit. For Comparative Example B29, the corrosion resistance on the cladding material side was deteriorated, because the amount of Zn in the cladding material was less than its lower limit. For Comparative Example B30, the corrosion resistance on the cladding material side was deteriorated, because the amount of Zn in the cladding material exceeded its upper limit. For Comparative Example B31, the corrosion resistance on the cladding material side was deteriorated, because the amount of Fe in the cladding material exceeded its upper limit. For Comparative Example B32, the post-braze strength was not sufficient, because the amount of Fe in the cladding material was less than its lower limit. For Comparative Example B33, the corrosion resistance on the cladding material side was deteriorated, because the amount of Cr in the cladding material exceeded its upper limit. For Comparative Example B34, the post-braze strength was not sufficient and the corrosion resistance on the cladding material side was deteriorated, because the amount of Cr in the cladding material was less than its lower limit. For Comparative Example B35, the brazeability at a brazing site on the cladding material side, because the amount of Mg in the cladding material exceeded its upper limit. For Comparative Example B36, the post-braze strength was not sufficient, because the amount of Mg in the cladding material was less than its lower limit. For Comparative Example B37, the corrosion resistance on the cladding material side was deteriorated, because the amount of Cu in the cladding material exceeded its upper limit. For Comparative Example B38, the post-braze strength was deteriorated, because the amount of Cu in the cladding material was less than its lower limit. For Comparative Example B39, the corrosion resistance on the cladding material side was deteriorated, because the cladding ratio of the cladding material was less than its lower limit. For Comparative Example B40, the corrosion resistance on the brazing material side was deteriorated, because the cladding ratio of the cladding material exceeded its upper limit.

Moreover, Examples B41 and B43 used the cladding material No. B22 and had the average Si composition that was equal to or less than (Si content)×0.5. On the other hand, Comparative Example B42 used the cladding material No. B23 and had the average Si composition that was larger than (Si content)×0.5. Therefore, Examples B41 and B43 were good in the brazeability, the tensile strength, the corrosion depth on the brazing material side, and the corrosion depth on the cladding material side, and were excellent in the corrosion depth on the cladding material side, especially.

Next, effects of Examples of the third aspect of the present invention are specifically described, comparing with Comparative Examples departing from the scope of the third aspect of the present invention.

Table 9 shows the composition of the core material and Table 10 shows the composition of the cladding material. In Table 9, Core materials Nos. C1 to C7 are Examples of the present invention and Core materials Nos. C8 to C17 are Comparative Examples. In Table 10, Cladding materials Nos. C1 to C7 are Examples of the present invention and Cladding materials Nos. C8 to C13 are Comparative Examples departing from the scope of the claims reciting the third aspect of the present invention.

TABLE 9

|  | Core material No. | Core material composition (mass %) | | | | | | | |
| --- | --- | --- | --- | --- | --- | --- | --- | --- | --- |
|  |  | Si | Fe | Cu | Mn | Mg | Cr | Ti | Al |
| Examples | C1 | 0.4 | 0.05 | 0.70 | 1.3 | 0.0 | 0.1 | 0.12 | Remainder |
|  | C2 | 0.8 | 0.05 | 0.70 | 1.3 | 0.0 | 0.1 | 0.12 | Remainder |
|  | C3 | 1.0 | 0.05 | 0.70 | 1.3 | 0.0 | 0.1 | 0.12 | Remainder |
|  | C4 | 0.8 | 0.05 | 0.30 | 1.3 | 0.0 | 0.1 | 0.12 | Remainder |
|  | C5 | 0.8 | 0.05 | 0.90 | 1.3 | 0.0 | 0.1 | 0.12 | Remainder |
| Comparative Examples | C6 | 0.8 | 0.05 | 0.70 | 1.3 | 0.0 | 0.0 | 0.12 | Remainder Cr: less than its lower limit |
|  | C7 | 0.8 | 0.05 | 0.70 | 1.3 | 0.0 | 0.4 | 0.12 | Remainder Cr: larger than its upper limit |
|  | C8 | 0.03 | 0.05 | 0.70 | 1.3 | 0.0 | 0.1 | 0.12 | Remainder Si: less than its lower limit |
|  | C9 | 0.8 | 0.05 | 0.15 | 1.3 | 0.0 | 0.1 | 0.12 | Remainder Cu: less than its lower limit |

TABLE 9-continued

| Core material No. | Core material composition (mass %) | | | | | | | | |
|---|---|---|---|---|---|---|---|---|---|
| | Si | Fe | Cu | Mn | Mg | Cr | Ti | Al | |
| C10 | 0.8 | 0.05 | 0.70 | 0.2 | 0.0 | 0.1 | 0.12 | Remainder | Mn: less than its lower limit |
| C11 | 0.8 | 0.05 | 0.70 | 1.3 | 0.3 | 0.1 | 0.12 | Remainder | Mg: larger than its upper limit |
| C12 | 0.8 | 0.05 | 0.70 | 1.3 | 0.0 | 0.1 | 0.00 | Remainder | Ti: less than its lower limit |
| C13 | 1.4 | 0.05 | 0.70 | 1.3 | 0.0 | 0.1 | 0.12 | Remainder | Si: larger than its upper limit |
| C14 | 0.8 | 0.3 | 0.70 | 1.3 | 0.0 | 0.1 | 0.12 | Remainder | Fe: larger than its upper limit |
| C15 | 0.8 | 0.05 | 1.1 | 1.3 | 0.0 | 0.1 | 0.12 | Remainder | Cu: larger than its upper limit |
| C16 | 0.8 | 0.05 | 0.70 | 1.9 | 0.0 | 0.1 | 0.12 | Remainder | Mn: larger than its upper limit |
| C17 | 0.8 | 0.05 | 0.70 | 1.3 | 0.0 | 0.1 | 0.31 | Remainder | Ti: larger than its upper limit |

TABLE 10

| | Skin material No. | Skin material composition (mass %) | | | | | | | | |
|---|---|---|---|---|---|---|---|---|---|---|
| | | Si | Fe | Cu | Mn | Mg | Zn | Cr | Al | |
| Examples | C1 | 0.8 | 0.17 | 0.10 | 0.89 | 0.01 | 4.5 | 0.03 | Remainder | |
| | C2 | 0.04 | 0.17 | 0.02 | 0.9 | 0.02 | 4.5 | 0.05 | Remainder | |
| | C3 | 0.80 | 0.20 | 0.02 | 0.9 | 0.01 | 4.1 | 0.03 | Remainder | |
| | C4 | 0.6 | 0.20 | 0.03 | 0.8 | 0.08 | 3.0 | 0.15 | Remainder | |
| | C5 | 0.75 | 0.18 | 0.11 | 0.85 | 0.09 | 5.2 | 0.3 | Remainder | Addition of Cr |
| | C6 | 0.6 | 0.16 | 0.03 | 0.85 | 0.15 | 4.0 | 0.03 | Remainder | Addition of Mg |
| | C7 | 0.85 | 0.15 | 0.15 | 0.85 | 0.02 | 4.1 | 0.03 | Remainder | Addition of Cu |
| Comparative Examples | C8 | 0.03 | 0.17 | 0.08 | 0.4 | 0.01 | 4.1 | 0.03 | Remainder | Si: less than its lower limit |
| | C9 | 1.3 | 0.19 | 0.08 | 0.4 | 0.02 | 4.5 | 0.05 | Remainder | Si: larger than its upper limit |
| | C10 | 0.1 | 0.22 | 0.03 | 0.2 | 0.10 | 3.2 | 0.15 | Remainder | Mn: less than its lower limit |
| | C11 | 0.8 | 0.18 | 0.10 | 2.3 | 0.02 | 4.2 | 0.15 | Remainder | Mn: larger than its upper limit |
| | C12 | 0.4 | 0.21 | 0.03 | 0.4 | 0.11 | 1.8 | 0.05 | Remainder | Zn: less than its lower limit |
| | C13 | 0.25 | 0.22 | 0.03 | 0.6 | 0.03 | 9.5 | 0.15 | Remainder | Zn: larger than its upper limit |

For each of the core materials listed in Table 9 and each of the cladding materials listed in Table 10, an aluminum alloy composite material for brazing shown in FIG. 1 was manufactured using a brazing material (JIS4045 alloy; Si: 10.5 mass %, Fe: 0.05 mass %, Cu: 0.05 mass %, Ti: 0.02 mass %, the remainder was formed from Al and unavoidable impurities). Tables 11 and 12 show combinations of the core material and the cladding material in the aluminum alloy composite material, the thickness of each of the core material and the cladding material, the thickness of the brazing material, and the entire thickness of the composite material.

TABLE 11

|  |  | Core material | | Skin material | | Brazing | Cladding | | Density of particles of precipitates or crystals having a size less than 0.1 μm (the number |
|---|---|---|---|---|---|---|---|---|---|
|  |  | Core material No. | Thickness (μm) | Skin material No. | Thickness (μm) | material Thickness (μm) | Entire thickness mm | ratio of skin material % | of particles per cubic millimeter) |
| Examples | C1 | C1 | 105 | C1 | 30 | 15 | 0.15 | 20.0 | $5.2 \times 10^8$ |
|  | C2 | C1 | 105 | C2 | 30 | 15 | 0.15 | 20.0 |  |
|  | C3 | C2 | 110 | C3 | 25 | 15 | 0.15 | 16.7 |  |
|  | C4 | C2 | 105 | C4 | 30 | 15 | 0.15 | 20.0 |  |
|  | C5 | C3 | 105 | C1 | 30 | 15 | 0.15 | 20.0 |  |
|  | C6 | C3 | 110 | C3 | 25 | 15 | 0.15 | 16.7 |  |
|  | C7 | C3 | 105 | C4 | 30 | 15 | 0.15 | 20.0 |  |
|  | C8 | C3 | 105 | C5 | 30 | 15 | 0.15 | 20.0 |  |
|  | C9 | C3 | 105 | C6 | 30 | 15 | 0.15 | 20.0 |  |
|  | C10 | C3 | 105 | C7 | 30 | 15 | 0.15 | 20.0 |  |
| Comparative | C11 | C6 | 105 | C3 | 30 | 15 | 0.15 | 20.0 |  |
| Examples | C12 | C7 | 105 | C3 | 30 | 15 | 0.15 | 20.0 |  |

TABLE 12

|  |  | Core material | | Skin material | | Brazing | Cladding | | Density of particles of precipitates or crystals having a size less than 0.1 μm (the number |
|---|---|---|---|---|---|---|---|---|---|
|  |  | Core material No. | Thickness (μm) | Skin material No. | Thickness (μm) | material Thickness (μm) | Entire thickness mm | ratio of skin material % | of particles per cubic millimeter) |
| Comparative | C13 | C6 | 105 | C3 | 30 | 15 | 0.15 | 20.0 |  |
| Examples | C14 | C7 | 105 | C3 | 30 | 15 | 0.15 | 20.0 |  |
|  | C15 | C8 | 105 | C3 | 30 | 15 | 0.15 | 20.0 |  |
|  | C16 | C9 | 105 | C3 | 30 | 15 | 0.15 | 20.0 |  |
|  | C17 | C11 | 105 | C3 | 30 | 15 | 0.15 | 20.0 |  |
|  | C18 | C12 | 105 | C3 | 30 | 15 | 0.15 | 20.0 |  |
|  | C19 | C13 | 105 | C3 | 30 | 15 | 0.15 | 20.0 |  |
|  | C20 | C14 | 105 | C3 | 30 | 15 | 0.15 | 20.0 |  |
|  | C21 | C15 | 105 | C3 | 30 | 15 | 0.15 | 20.0 |  |
|  | C22 | C16 | 105 | C3 | 30 | 15 | 0.15 | 20.0 |  |
|  | C23 | C3 | 105 | C8 | 30 | 15 | 0.15 | 20.0 |  |
|  | C24 | C3 | 105 | C9 | 30 | 15 | 0.15 | 20.0 |  |
|  | C25 | C3 | 105 | C10 | 30 | 15 | 0.15 | 20.0 |  |
|  | C26 | C3 | 105 | C11 | 30 | 15 | 0.15 | 20.0 |  |
|  | C27 | C3 | 105 | C12 | 30 | 15 | 0.15 | 20.0 |  |
|  | C28 | C3 | 105 | C13 | 30 | 15 | 0.15 | 20.0 |  |
|  | C29 | C3 | 127 | C3 | 8 | 15 | 0.15 | 5.3 |  |
|  | C30 | C3 | 85 | C3 | 50 | 15 | 0.15 | 33.3 |  |
|  | C31 | C3 | 105 | C3 | 30 | 15 | 0.15 | 20 | $4.8 \times 10^8$ |

For each of the composite materials listed in Tables 11 and 12, a brazeability test, a measurement of tensile strength, and an anticorrosion test were performed in the following manner. In the brazeability test, 5 g/m² of Nocolok flux was applied onto a brazing-material side surface of the aluminum alloy composite material and was then dried. Then, that aluminum alloy composite material was heated in a nitrogen atmosphere having a dew point of −40° C. under a condition in which the temperature was increased to 600° C. and was kept at 600° C. for two minutes.

The brazeability was evaluated based on a fluid coefficient obtained by a drop test in the aforementioned manner, considering simplification and quantification of the evaluation of the brazeability.

The evaluation result is shown below in Tables 13 and 14. In Tables 13 and 14, in a field of "Brazeability", the aluminum alloy composite material having a fluidity of 65% or more is shown with circle, whereas the aluminum alloy composite material having a fluidity less than 65% is shown with cross.

Moreover, transmission electron microscopic observation was made so as to measure the thickness from fringes of equal thickness and to measure the number of particles of precipitates or crystallized particles in the cladding material per unit volume.

TABLE 13

|  | No. | Brazeability (fluid coefficient) % | Tensile strength MPa | Depth of corrosion on brazing material side μm | Depth of corrosion on skin material side μm | Reason why Comparative Example is inferior |
|---|---|---|---|---|---|---|
| Examples | C1 | 70%○ | 162○ | ○ | ○ | |
| | C2 | 70%○ | 160○ | ○ | ○ | |
| | C3 | 70%○ | 164○ | ○ | ○ | |
| | C4 | 70%○ | 159○ | ○ | ○ | |
| | C5 | 70%○ | 163○ | ○ | ○ | |
| | C6 | 70%○ | 165○ | ○ | ○ | |
| | C7 | 70%○ | 166○ | ○ | ○ | |
| | C8 | 70%○ | 168○ | ○ | ○ | Deterioration of corrosion resistance on skin material side |
| | C9 | 70%○ | 167○ | ○ | ○ | Deterioration of corrosion resistance on skin material side |
| | C10 | 70%○ | 168○ | ○ | ○ | Deterioration of corrosion resistance on skin material side |
| Comparative Examples | C11 | 70%○ | 158○ | ○ | ○ | Slightly insufficient strength |
| | C12 | 70%○ | 163○ | ○ | ○ | Slight lowering of productivity |

TABLE 14

|  | No. | Brazeability (fluid coefficient) % | Tensile strength MPa | Depth of corrosion on brazing material side μm | Depth of corrosion on skin material side μm | Reason why Comparative Example is inferior |
|---|---|---|---|---|---|---|
| Comparative Examples | C13 | 70%○ | 148X | ○ | ○ | Insufficient post-braze strength |
| | C14 | 70%○ | 145X | ○ | ○ | Insufficient post-braze strength |
| | C15 | 70%○ | 146X | ○ | ○ | |
| | C16 | 60%X | 165○ | ○ | ○ | Inferior brazeability |
| | C17 | 70%○ | 162○ | X | ○ | Deterioration of corrosion resistance of core material |
| | C18 | — | — | — | — | Occurrence of melting of core material |
| | C19 | 70%○ | 163○ | X | ○ | Deterioration of corrosion resistance of core material |
| | C20 | — | — | — | — | Occurrence of melting of core material |
| | C21 | 70%○ | 164○ | ○ | ○ | Lowering of productivity |
| | C22 | 70%○ | 162○ | ○ | ○ | Lowering of productivity |
| | C23 | 70%○ | 156X | ○ | ○ | Insufficient post-braze strength |
| | C24 | 70%○ | 167○ | ○ | X | Deterioration of corrosion resistance on skin material side |
| | C25 | 70%○ | 157X | ○ | ○ | Insufficient post-braze strength |
| | C26 | 70%○ | 165○ | ○ | ○ | Lowering of productivity |
| | C27 | 70%○ | 164○ | ○ | X | Deterioration of corrosion resistance on skin material side |

TABLE 14-continued

| No. | Brazeability (fluid coefficient) % | Tensile strength MPa | Depth of corrosion on brazing material side μm | Depth of corrosion on skin material side μm | Reason why Comparative Example is inferior |
|---|---|---|---|---|---|
| C28 | 70%○ | 164○ | ○ | X | Deterioration of corrosion resistance on skin material side |
| C29 | 70%○ | 162○ | ○ | X | Deterioration of corrosion resistance on skin material side |
| C30 | 70%○ | 160○ | X | ○ | Degradation of the corrosion resistance on the brazing material side |
| C31 | 70%○ | 162○ | ○ | X | Deterioration of corrosion resistance on skin material side |

In order to obtain the post-braze strength, a tensile test (JISZ2241) was performed for the aluminum alloy composite material after being heated in a similar manner to that in the aforementioned brazeability test. The result of the tensile test is also shown in Table 14. The post-braze strength exceeding 158 MPa is shown with circle, whereas the post-braze strength equal to or less than 158 MPa is shown with cross.

In the corrosion test on the brazing material side, CASS test (Item (5) of JISH8681) was performed for 250 hours in a row for the aluminum alloy composite material that was heated in a similar manner to that in the brazeability test. The result of this test is also shown in Table 14. In a field of "Depth of corrosion on brazing material side" in Table 14, the composite material in which the depth of the corrosion on the brazing side was equal to or smaller than 70 μm is shown with circle, whereas the composite material in which that depth exceeded 70 μm is shown with cross.

In order to obtain the corrosion resistance on the cladding material side, a corrosion test was performed for the cladding material side of the aluminum alloy composite material. In the corrosion test on the cladding material side, a corrosion test was performed for the aluminum alloy composite material that was heated in a similar manner to that in the brazeability test, by using artificial water (Cl: 300 ppm by mass, $SO_4$: 100 ppm by mass, and Cu: 5 ppm by mass). While the aluminum alloy composite material was immersed in the artificial water, a cycle test that includes a process for keeping the aluminum alloy composite material at 88° C. for 8 hours (containing a heating time from a room temperature to 88° C.) and a process for keeping the aluminum alloy composite material at a room temperature for 16 hours (containing a cooling time from 88° C. to the room temperature) was performed for 30 days. The result is shown in Table 14. In a field of "Depth of corrosion on cladding material side" in Table 14, the composite material in which the depth of corrosion on the cladding material side was equal to or less than 30 μm is shown with circle, whereas the composite material in which that depth exceeded 30 μm is shown with cross.

As shown in Table 14, Examples C1 to C10 of the present invention were good in all the brazeability, the tensile strength, the corrosion depth on the brazing material side, and the corrosion depth on the cladding material side. On the other hand, Comparative Example C11 was slightly insufficient in the post-braze strength, because the amount of Cr in the core material was less than its lower limit. For Comparative Example C12, the productivity was slightly lowered, because the amount of Cr in the core material exceeded its upper limit. For Comparative Example C13, the post-braze strength was not sufficient, because the amount of Si in the core material was less than its lower limit. For Comparative Example C14, the post-braze strength was not sufficient, because the amount of Cu in the core material was less than its lower limit. For Comparative Example C15, the post-braze strength was not sufficient, because the amount of Mn in the core material was less than its lower limit. For Comparative Example C16, the brazeability was inferior, because the amount of Mg in the core material exceeded its upper limit. For Comparative Example C17, the corrosion resistance of the core material was deteriorated, because the amount of Ti in the core material was lower than its lower limit. For Comparative Example C18, melting of the core material occurred, because the amount of Si in the core material exceeded its upper limit. For Comparative Example C19, the corrosion resistance of the core material was deteriorated, because the amount of Fe in the core material exceeded its upper limit. For Comparative Example C20, melting of the core material occurred, because the amount of Cu in the core material exceeded its upper limit. For Comparative Example C21, the productivity was lowered, because the amount of Mn in the core material exceeded its upper limit. For Comparative Example C22, the productivity was lowered, because the amount of Ti in the core material exceeded its upper limit.

For Comparative Example C23, the post-braze strength was not sufficient, because the amount of Si in the cladding material was lower than its lower limit. For Comparative Example C24, the corrosion resistance on the cladding material side was deteriorated, because the amount of Si in the cladding material exceeded its upper limit. For Comparative Example C25, the post-braze strength was not sufficient, because the amount of Mn in the cladding material was lower than its lower limit. For Comparative Example C26, the productivity was deteriorated, because the amount of Mn in the cladding material exceeded its upper limit. For Comparative Example C27, the corrosion resistance on the cladding material side was deteriorated, because the amount of Zn in the cladding material was less than its lower limit. For Comparative Example C28, the corrosion resistance on the cladding material side was deteriorated, because the amount of Zn in the cladding material exceeded its upper limit. For Comparative Example C29, the corrosion resistance on the cladding material side was deteriorated, because the cladding ratio of the cladding material was less than its lower limit. For Comparative Example C30, the corrosion resistance on the brazing material side was deteriorated, because the cladding ratio of the cladding material exceeded its upper limit. For Comparative Example C31, the corrosion resistance on the cladding material side was deteriorated, because the number of particles of the precipitates or crystallized particles having a predetermined size in the cladding material was equal to or less than its lower limit.

The invention claimed is:

1. An aluminum alloy composite material for brazing, comprising:
   a core material;
   a brazing material formed of an Al—Si based aluminum alloy on one surface of the core material; and
   a cladding material formed on the other surface of the core material,
   each of the core material, the brazing material and the cladding material having a plate shape of roughly fixed thickness, the cladding material having a cladding ratio of 6 to 30% with respect to an entire thickness of the aluminum alloy composite material,
   the core material having a composition consisting essentially of 0.2 mass % or less of Mg, 0.02 to 0.3 mass % of Cr, 0.2 mass % or less of Fe, 0.2 to 1.0 mass % of Cu, 0.05 to 1.3 mass % of Si, 0.3 to 1.8 mass % of Mn, and 0.02 to 0.3 mass % of Ti in such a manner that a total content of Cu and Si is in a range of 2.0 mass % or less and a remainder of Al and unavoidable impurities, and
   the cladding material containing 2 to 9 mass % of Zn; at least one selected from the group consisting of 0.3 to 1.8 mass % of Mn and 0.04 to 1.2 mass % of Si; at least one selected from the group consisting of 0.02 to 0.25 mass % of Fe, 0.01 to 0.30 mass % of Cr, and 0.001 to 0.15 mass % of Cu; and a remainder of Al and unavoidable impurities.

2. The aluminum alloy composite material according to claim 1, wherein the cladding material contains 3 mass % or more of Zn and a Zn/Si mass ratio is 4 or more.

3. An aluminum alloy composite material for brazing, comprising:
   a core material;
   a brazing material formed of an Al—Si based aluminum alloy on one surface of the core material; and
   a cladding material formed on the other surface of the core material,
   each of the core material, the brazing material and the cladding material having a plate shape of roughly fixed thickness, the cladding material having a cladding ratio of 6 to 30% with respect to an entire thickness of the aluminum alloy composite material,
   the core material having a composition consisting essentially of 0.2 mass % or less of Mg, 0.02 to 0.3 mass % of Cr, 0.2 mass % or less of Fe, 0.2 to 1.0 mass % of Cu, 0.05 to 1.3 mass % of Si, 0.3 to 1.8 mass % of Mn, and 0.02 to 0.3 mass % of Ti in such a manner that a total content of Cu and Si is in a range of 2.0 mass % or less and a remainder of Al and unavoidable impurities, and
   the cladding material containing 2 to 9 mass % of Zn, 0.3 to 1.8 mass % of Mn, 0.5 to 1.2 mass % of Si, at least one selected from the group consisting of 0.02 to 0.25 mass % of Fe, 0.01 to 0.30 mass % of Cr, and 0.001 to 0.15 mass % of Cu, and a remainder of Al and unavoidable impurities, wherein in the cladding material a ratio of a sum of a total amount of Si in solid solution and a total amount of Si in precipitates having a grain size of less than 10 μm to said Si content of the cladding material is equal to or less than 0.5.

4. The aluminum alloy composite material according to claim 3, wherein the cladding material contains 3 mass % or more of Zn and a Zn/Si mass ratio is 4 or more.

* * * * *